United States Patent
Armstrong et al.

(12)

(10) Patent No.: US 11,907,021 B2
(45) Date of Patent: Feb. 20, 2024

(54) DEPLOYABLE CASE FOR ELECTRONIC DEVICE AND METHOD OF DEPLOYING A DEPLOYABLE CASE

(71) Applicant: Urban Armor Gear, LLC, Laguna Niguel, CA (US)

(72) Inventors: Steven Armstrong, Laguna Niguel, CA (US); Jay Veltz, Laguna Niguel, CA (US); Bryan Soriano, Pamona, CA (US)

(73) Assignee: Urban Armor Gear, LLC, Laguna Niguel, CA (US)

( * ) Notice: Subject to any disclaimer, the term of this patent is extended or adjusted under 35 U.S.C. 154(b) by 705 days.

(21) Appl. No.: 16/858,422

(22) Filed: Apr. 24, 2020

(65) Prior Publication Data

US 2020/0341521 A1  Oct. 29, 2020

Related U.S. Application Data

(63) Continuation-in-part of application No. 29/688,838, filed on Apr. 24, 2019, now abandoned, and a
(Continued)

(51) Int. Cl.
*G06F 1/16* (2006.01)
*A45C 11/00* (2006.01)
*A45C 13/00* (2006.01)

(52) U.S. Cl.
CPC ............ *G06F 1/1656* (2013.01); *A45C 11/00* (2013.01); *A45C 13/001* (2013.01);
(Continued)

(58) Field of Classification Search
CPC ............ H04M 1/0206; H04M 1/0214; H04M 1/0225; H04M 1/0247; H04M 1/0249;
(Continued)

(56) References Cited

U.S. PATENT DOCUMENTS 8,766,921 B2 * 7/2014 Ballagas ............... G06F 1/1669
  345/168
8,794,436 B2 * 8/2014 Hsu ...................... F16M 11/041
  206/320
(Continued)

FOREIGN PATENT DOCUMENTS

KR  20-0460420 Y1 *  5/2012  ............... G06F 1/16
KR  20-0460420 Y1    5/2012
(Continued)

OTHER PUBLICATIONS

International Search Report and Written Opinion, dated Jun. 5, 2020, for International Application No. PCT/US2020/016447 filed on Feb. 3, 2020.

*Primary Examiner* — Quochien B Vuong
(74) *Attorney, Agent, or Firm* — Neal, Gerber & Eisenberg LLP

(57) ABSTRACT

A deployable protective case and a method of deploying said case is provided. The case includes a main body which is divided into an upper portion and lower portion that are separated by a living hinge. The case is configured with guide surfaces that allow for the case to engage with more than one electronic device, such as a tablet and a keyboard. The protective case is movable to a stowed configuration and a deployed configuration. In the stowed configuration, the devices are protected during storage and transportation. In the deployed configuration, the devices are made accessible for use, such as by positioning a tablet relative to a keyboard. While deployed, the case maintains engagement with at least a part of the electronic device.

20 Claims, 27 Drawing Sheets

Related U.S. Application Data continuation of application No. PCT/US2020/016447, filed on Feb. 3, 2020, and a continuation-in-part of application No. 29/679,067, filed on Feb. 1, 2019, now Pat. No. Des. 892,803.

(60) Provisional application No. 62/838,134, filed on Apr. 24, 2019.

(52) U.S. Cl.
CPC .......... *A45C 13/005* (2013.01); *G06F 1/1616* (2013.01); *G06F 1/1681* (2013.01); *A45C 2011/003* (2013.01)

(58) Field of Classification Search
CPC ..... H04M 1/0254; H04M 1/0256; G06F 1/16; G06F 1/1613; G06F 1/1615; G06F 1/1616; G06F 1/1628; G06F 1/1656; G06F 1/1658; G06F 1/166; G06F 1/1662; G06F 1/1669; G06F 1/1675; G06F 1/1681; A45C 11/10; A45C 13/001; A45C 13/005

See application file for complete search history.

(56) References Cited

U.S. PATENT DOCUMENTS

| | | | | |
|---|---|---|---|---|
| 8,875,879 | B2* | 11/2014 | Diebel | G06F 1/1626 |
| | | | | 206/45.24 |
| 9,141,136 | B2* | 9/2015 | Shulenberger | G06F 1/1628 |
| 9,532,631 | B2* | 1/2017 | Gu | A45C 11/00 |
| 9,715,254 | B2* | 7/2017 | Mori | G06F 1/1662 |
| 10,372,171 | B2* | 8/2019 | Lee | G06F 1/1616 |
| D892,803 | S | 8/2020 | Armstrong et al. | |
| 10,871,016 | B2* | 12/2020 | Zhai | G06F 1/1632 |
| 2009/0234975 | A1* | 9/2009 | Chang | G06F 1/1616 |
| | | | | 710/1 |
| 2014/0061071 | A1* | 3/2014 | Kim | A45C 11/00 |
| | | | | 206/45.2 |
| 2018/0210503 | A1 | 7/2018 | Fathollahi et al. | |
| 2019/0324504 | A1* | 10/2019 | Sharma | A45C 11/00 |

FOREIGN PATENT DOCUMENTS

| | | |
|---|---|---|
| KR | 10-1257295 B1 | 4/2013 |
| KR | 20-0477120 Y1 | 5/2015 |
| KR | 10-1608931 B1 | 4/2016 |
| WO | 2020/160556 A1 | 8/2020 |

\* cited by examiner

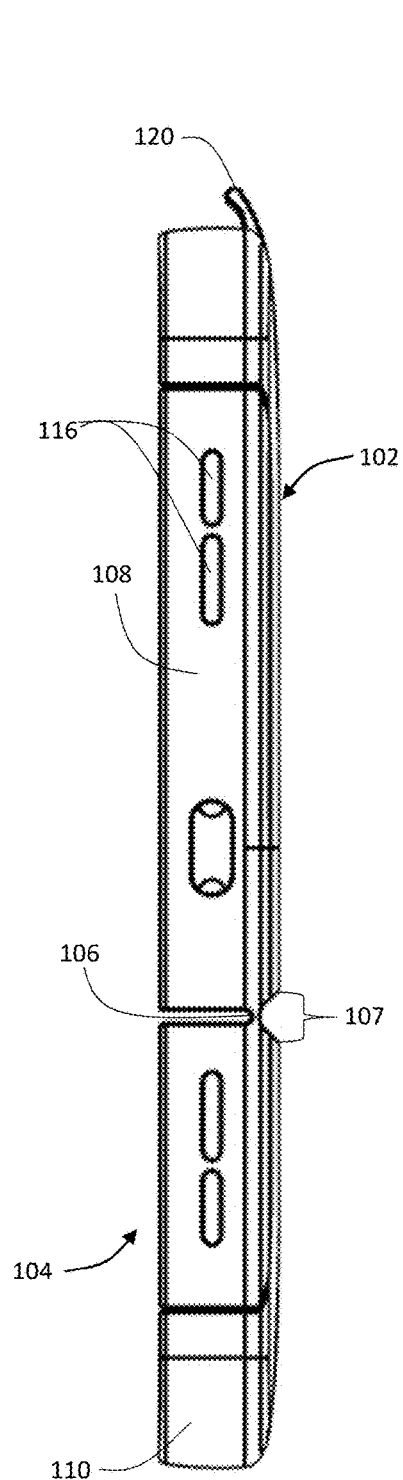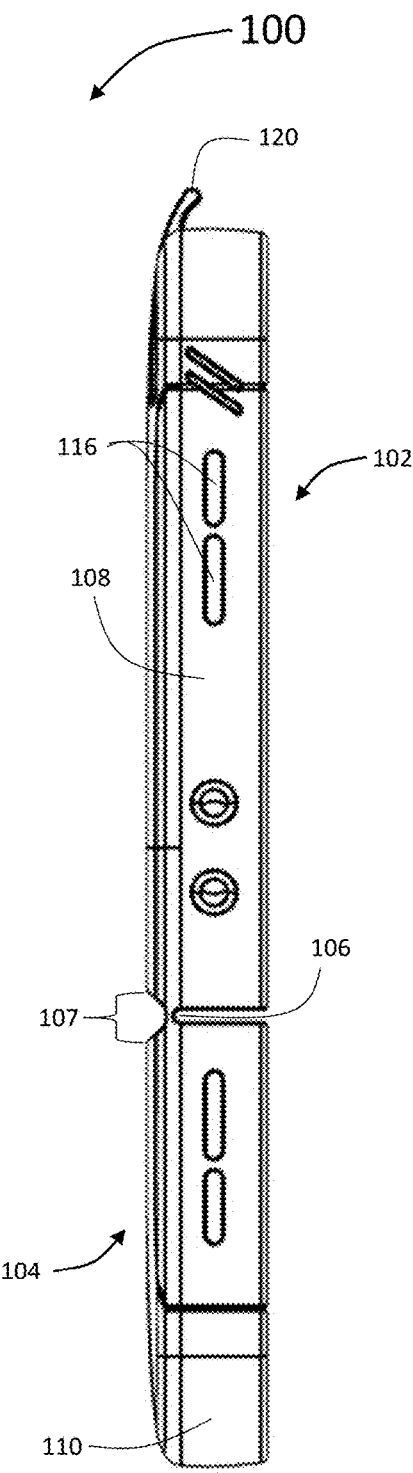
Fig. 4
Fig. 5

DEPLOYABLE CASE FOR ELECTRONIC DEVICE AND METHOD OF DEPLOYING A DEPLOYABLE CASE

CROSS-REFERENCE TO RELATED APPLICATIONS

This application claims priority to:
U.S. Provisional Patent Application Ser. No. 62/838,134, filed Apr. 24, 2019, the entire disclosure of which is incorporated herein by reference;
U.S. Design application Serial No. 29/688,838, filed Apr. 24, 2019;
Patent Cooperation Treaty Application Serial No. PCT/US20/16447, filed Feb. 3, 2020; and
U.S. Design application Serial No. 29/679,067, filed Feb. 1, 2019;
the entire disclosures of which are incorporated herein by reference.

FIELD OF THE INVENTION

The present invention relates generally to mobile electronics cases. More specifically, the present invention is concerned with a case for mobile electronics that accommodates a mobile electronic device with a cover, the case being configurable to selectively store and deploy a keyboard accessory for the mobile electronic device.

BACKGROUND

As the integration of mobile computing deepens within society, many consumers are demanding devices that are capable of operating with multiple modalities, such as a single device that can function as a traditional computer or a laptop and as a tablet. Beyond designing products for this specific purpose, certain product providers have developed products that can transform existing, single modality devices into multiple modality devices. One example is the Apple iPad, which operates out of the box as a tablet device, with no additional modality. Nevertheless, by adding a keyboard accessory, one can utilize the device in the same manner as a traditional laptop with a touchscreen, adding a second modality to the device.

As this aftermarket addition of capability has grown, consumers have found it cumbersome and impractical to carry with them an additional keyboard at all times. Responding to this, product providers released keyboard accessories that were integrated into covers, the entire assembly which then attached to the iPad with the intention of carrying the keyboard cover everywhere the iPad went. Some of these keyboard covers can fold to create a wedge geometry that supports the screen the iPad at an angle while allowing a user to utilize the keyboard. This solution solves the problem of keyboard mobility, but it introduces new problems of protection of the electronic device.

It is a well-known that mobile electronics are typically fragile. The day to day wear and tear on a device is significant and results in cosmetic and functional defects. A single traumatic incident to a device, such as simply a drop of a few feet, can prove catastrophic and may render the device unusable. To counter this, aftermarket products have been provided that provide a protective layer or case to house the electronics. Traditional cases are made of a robust material and are designed to provide a sacrificial layer that takes the brunt of damage while protecting the electronic device inside. Nevertheless, typical cases do not accommodate accessories, especially accessories that require moving parts to be deployed by a user.

The keyboard covers discussed above underscore this issue, as the keyboard is a secondary electronic device that not only impedes the ability for a traditional case to protect an electronic device, but it also introduces an additional device, the keyboard itself, that needs to be protected. Without a case that conforms and configures to accommodate the moving parts of the keyboard cover, both the electronic device and the keyboard are at a high risk of damage from wear and tear and/or traumatic incidence. Accordingly, there is a need for a protective case that accommodates the configurable and functional aspects of a keyboard case while still providing protection for the keyboard and the electronic device.

SUMMARY

The present invention comprises a protective case for an Apple iPad (or other electronic device) with a corresponding keyboard cover. The case is configured to be usable in a stowed configuration, where the user has not deployed the keyboard of the keyboard cover, and in a deployed configuration, where the user has deployed the keyboard of the keyboard cover. The case of embodiments of the present invention is movable between these two configurations by way of a living hinge formed into the main body of the case. In the stowed configuration, the living hinge is not being utilized, and the case operates to protect the iPad and the keyboard cover similar to a traditional electronics case. When moved to a deployed configuration, the living hinge is utilized to move a lower portion of the case back and out of the way, so that the keyboard cover swings down from the face of the iPad and deploys as the keyboard typically does. As the keyboard cover swings down, a lower portion of the keyboard cover, which resides along the backside of the iPad, hinges outward to create a levered support for the iPad. The living hinge of the case accommodates this movement. The lower portion of the case is configured so that it readily detaches from the iPad, so that moving the lower portion about the living hinge is achieved relatively easily. In both configurations, the top portion of the case remains connected to the iPad, facilitating protection of a substantial portion of the iPad at all times.

In some embodiments, the case is configurable in stowed and deployed configurations. In some embodiments, while in the stowed configuration, the living hinge is unrotated, as such both the upper and lower portions engage with all of the one or more electronic device and/or accessories within the case. In some embodiments, a mobile device with a cover are secured within the case, such that the cover or the mobile device are the article within the case closest to the interior wall of the case. In some embodiments, a keyboard accessory is the article within the case furthest form the interior wall of the case, such that at least an electronic device resides within the case closer to the interior wall than the keyboard accessory. In some embodiments, the accessory is a keyboard cover, which wraps around the electronic device, the entire assembly of which subsequently reside securely with the case.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

FIG. 4 is a right elevation view of the case of FIG. 1.

FIG. 5 is a left elevation view of the case of FIG. 1.

DETAILED DESCRIPTION

Figure 1:
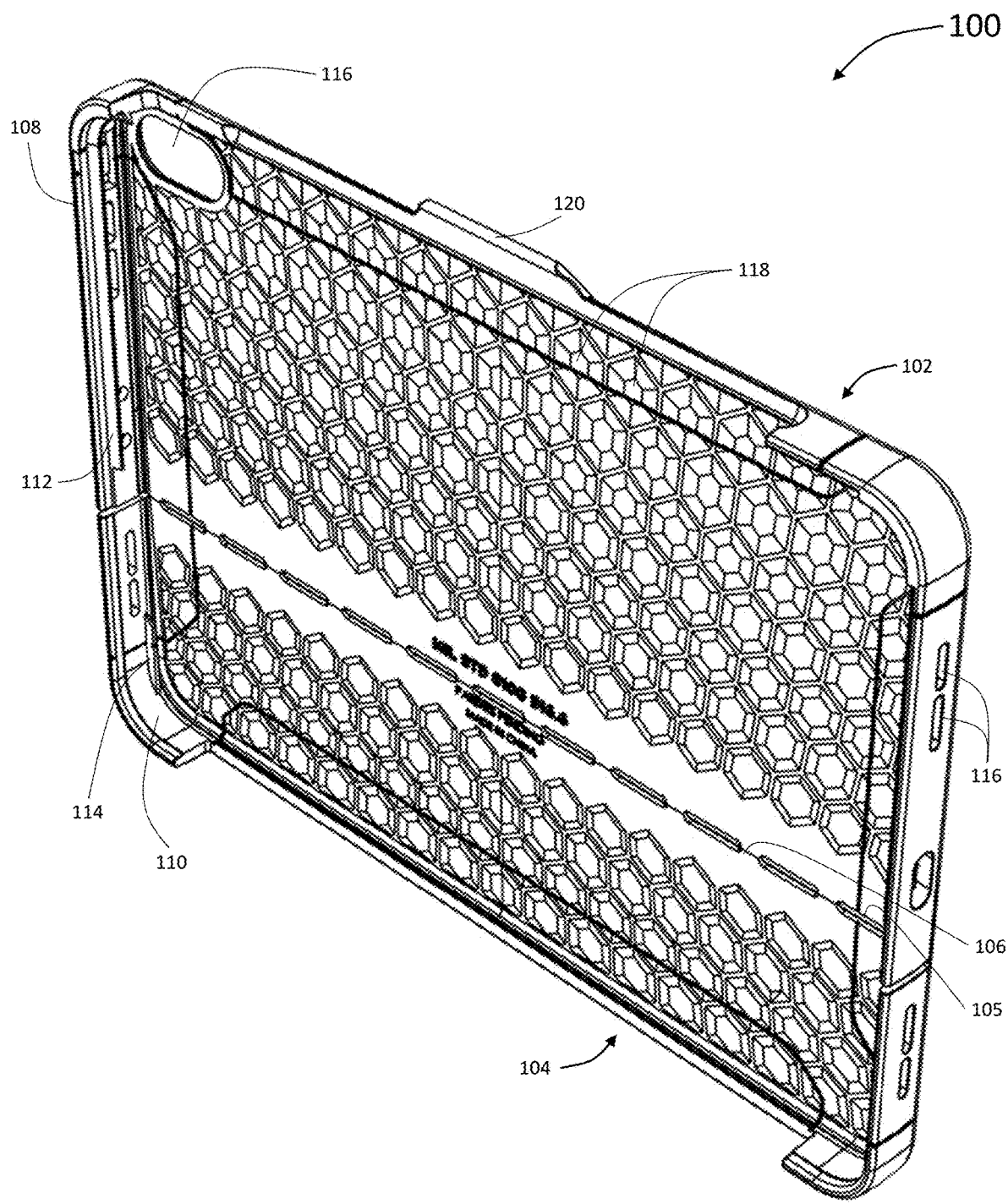
FIG. 1 is a front perspective view of a case according to a first embodiment of the present invention, the case shown in a stowed configuration.

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present invention comprises a protective case 100 for use with an electronic device 10, such as a tablet or the like, thereby protecting the electronic device 10 while facilitating use of the electronic device 10 with a corresponding keyboard 24. The case 100 is configured to engage with the electronic device. In some embodiments, the case is configured to engage with a keyboard 24 and/or a cover 22 engaged with the keyboard and/or the electronic device. In some embodiments, the keyboard 24 is engaged with and/or forms part of the cover 22.

The case 100 is configured to be selectively usable in a stowed configuration, where the user has not deployed the keyboard 24 and/or the cover 22, and in a deployed configuration, where the user has deployed the keyboard 24 and/or the cover 22. In some embodiments, the case 100 of embodiments of the present invention is movable between these two configurations by way of a living hinge 106 formed into the main body of the case 100. In the stowed configuration, the living hinge 106 is in a relaxed configuration, and the case operates to protect the electronic device 10 and the cover 22 similar to a traditional electronics case. When moved to a deployed configuration, the living hinge 106 is utilized to move a lower portion 104 of the case 100 back and out of the way, such as by deforming the material of the living hinge. In some embodiments, moving the case from the stowed configuration to the deployed configuration facilitates swinging a cover 22 down from a front face of the electronic device 10, such as to deploy a keyboard 24. As the cover 22 swings down, a lower portion of the cover 22, which resides along the backside of the electronic device 10, hinges outward away from a back side of the electronic device to create a levered support for the electronic device 10. The living hinge 106 of the case 100 accommodates this movement. In other embodiments, the living hinge provides at least some of the levered support for the electronic device 10, such as in embodiments without a cover 22.

The lower portion 104 of the case 100 is configured such that it readily attaches to and detaches from the electronic device 10, thereby facilitating movement of the case 100 between the stowed and deployed configurations. In both configurations, the upper portion 102 of the case 100 remains connected to the electronic device 10, thereby protecting a substantial portion of the electronic device 10 at all times.

Figure 2:
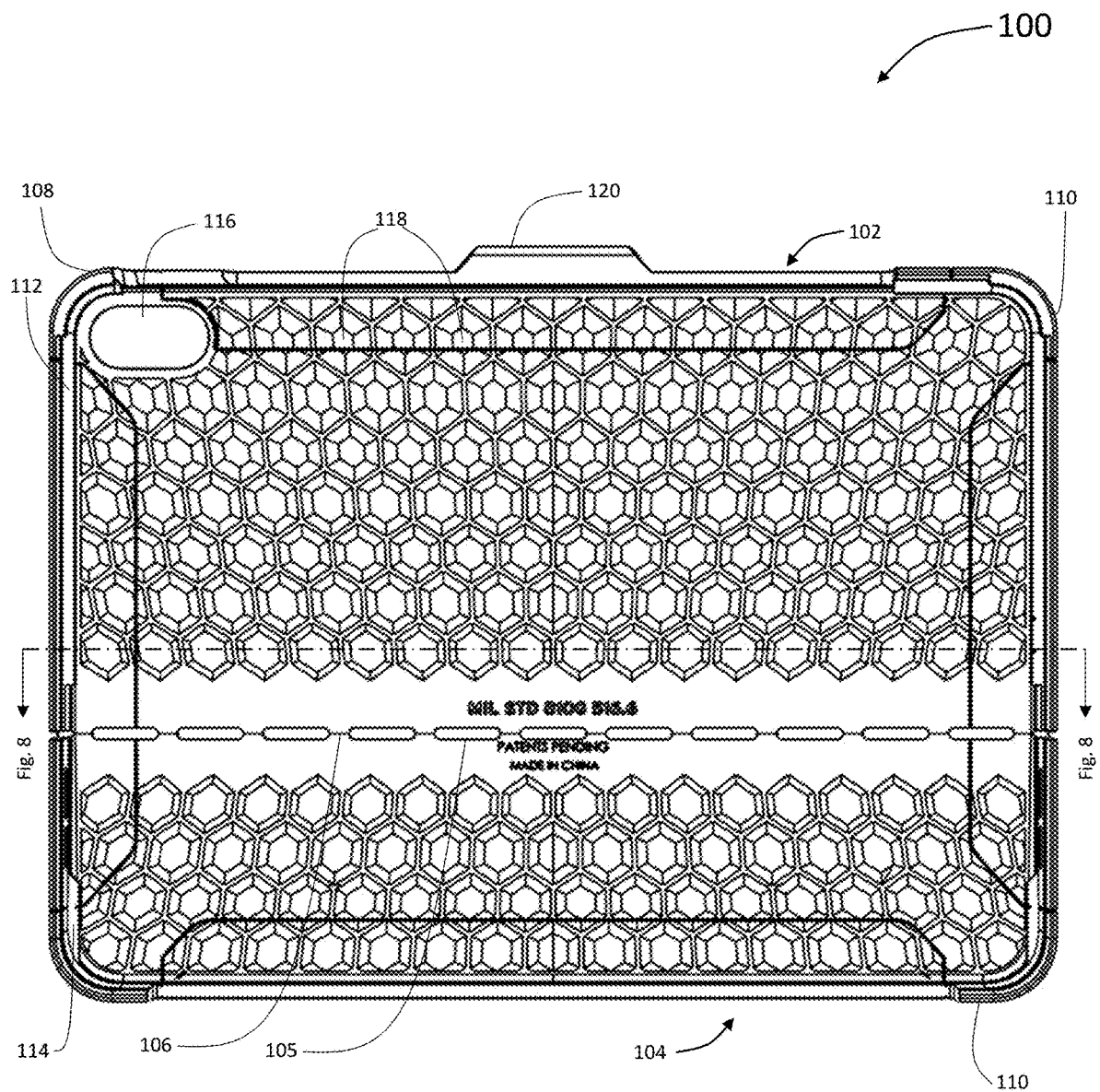
FIG. 2 is a front elevation view of the case of FIG. 1.
Figure 3:
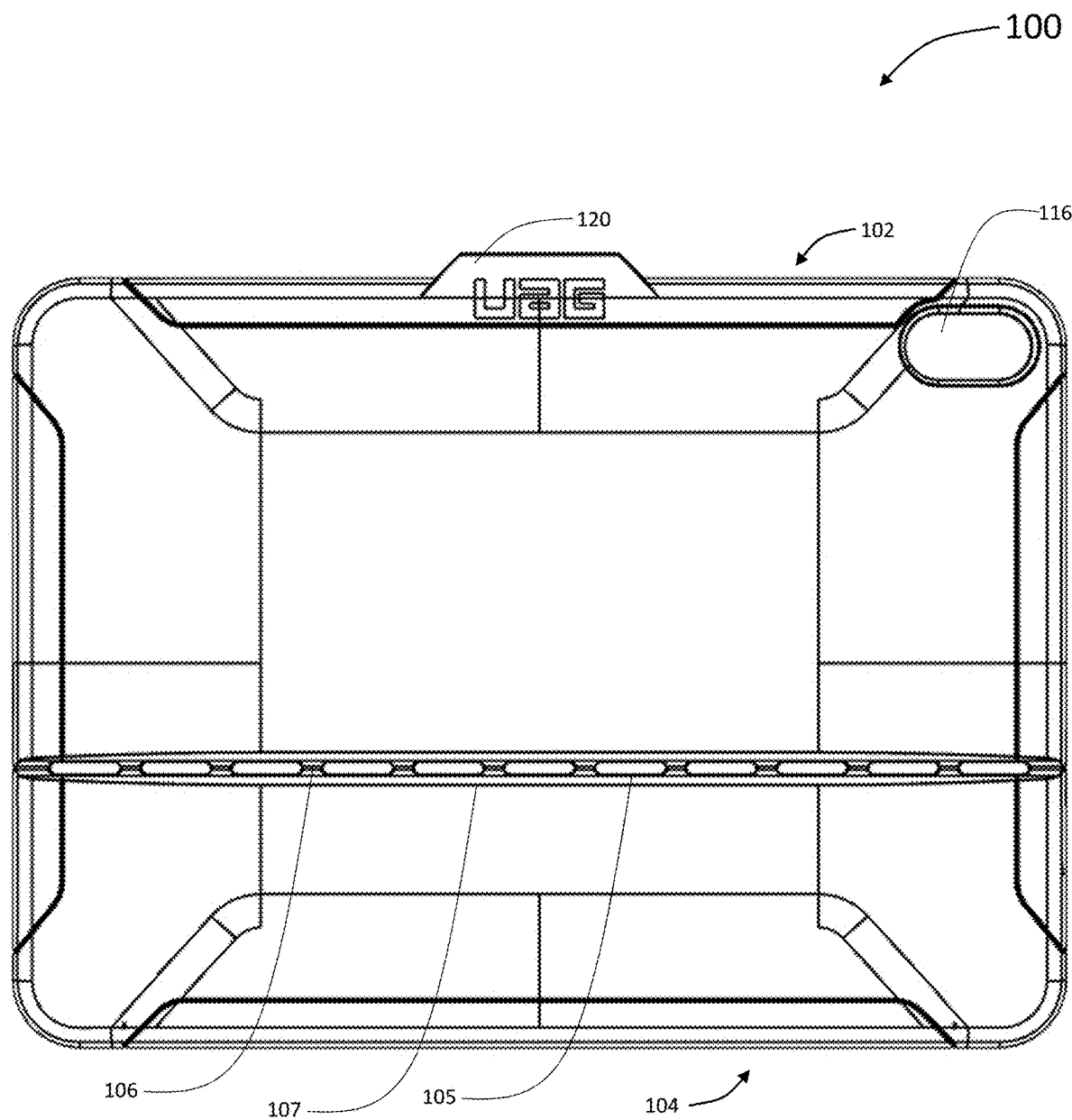
FIG. 3 is a rear elevation view of the case of FIG. 1.
Figure 6:
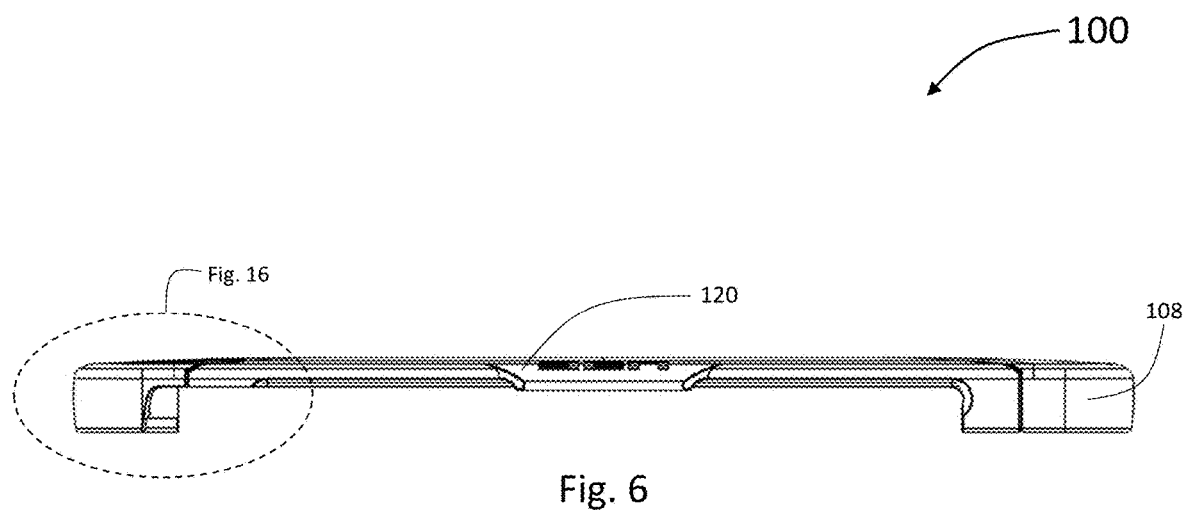
FIG. 6 is a top plan view of the case of FIG. 1
Figure 7:
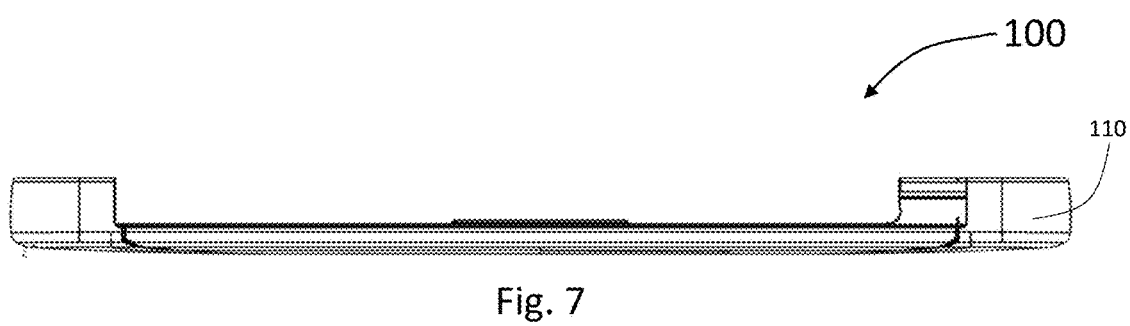
FIG. 7 is a bottom plan view of the case of FIG. 1.
Figure 8:
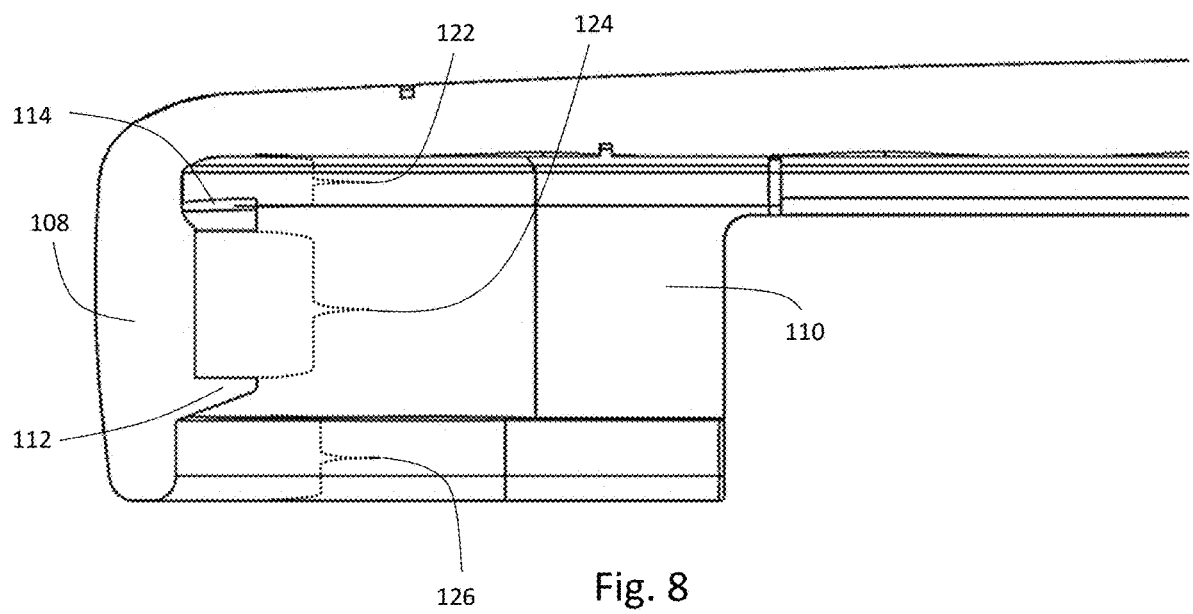
FIG. 8 is a partial sectional view of the case of FIG. 1, bisecting the case of FIG. 1 approximately one-half of the distance along the axis of view of FIG. 6.
Figure 9:
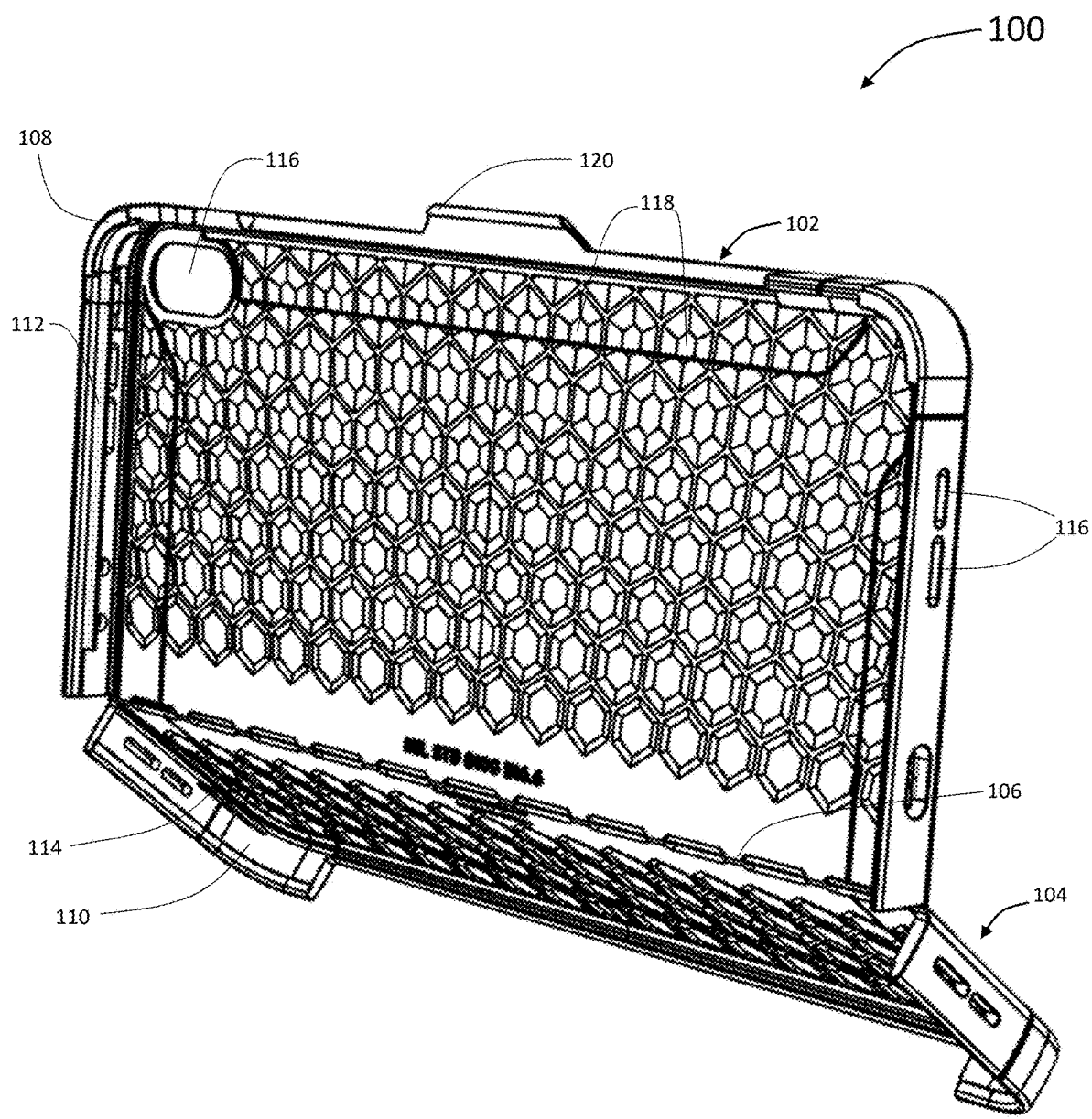
FIG. 9 is a perspective view of the case of FIG. 1, the case shown in a deployed configuration.
Figure 10:
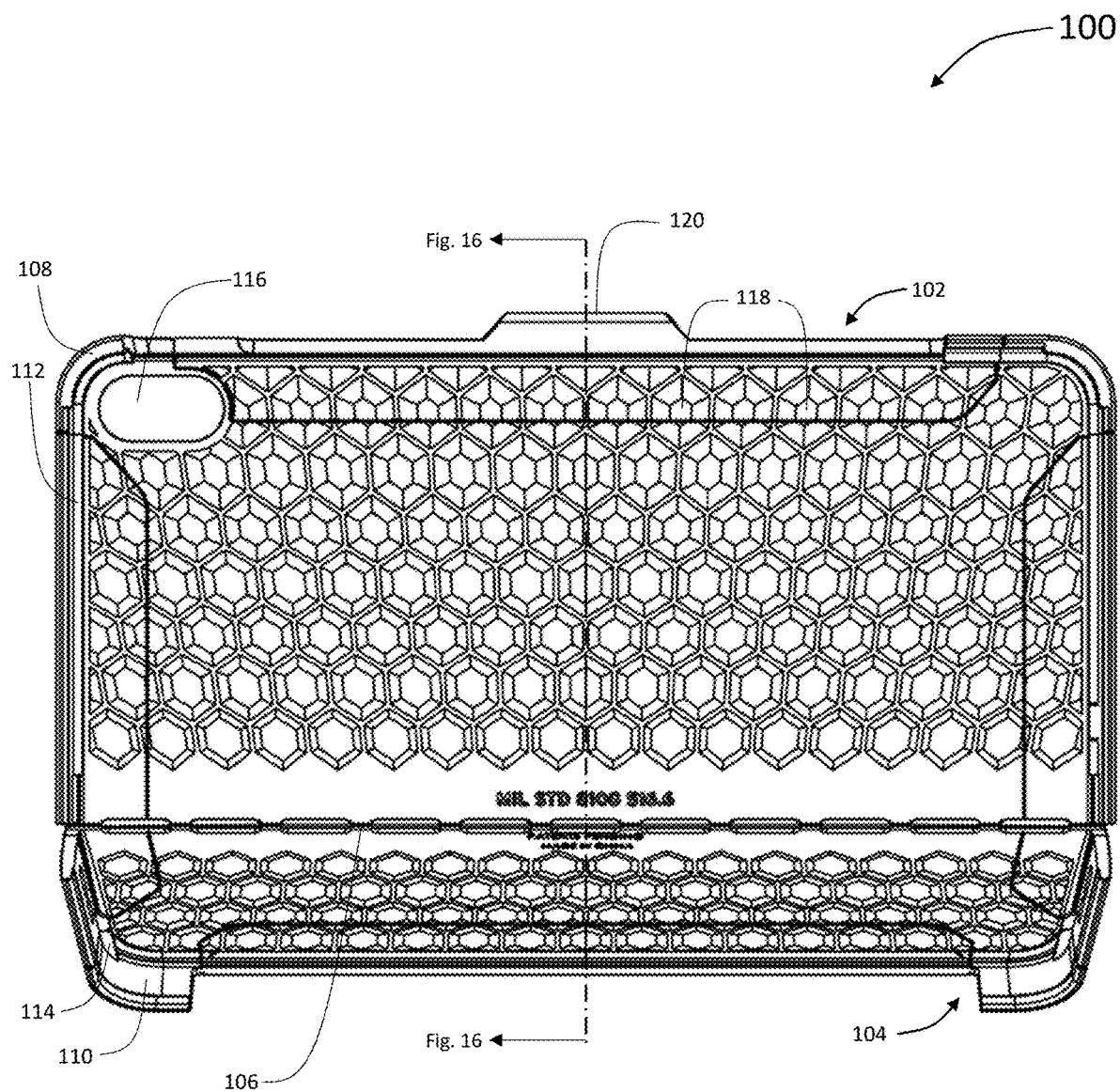
FIG. 10 is a front elevation view of the case of FIG. 9.
Figure 11:
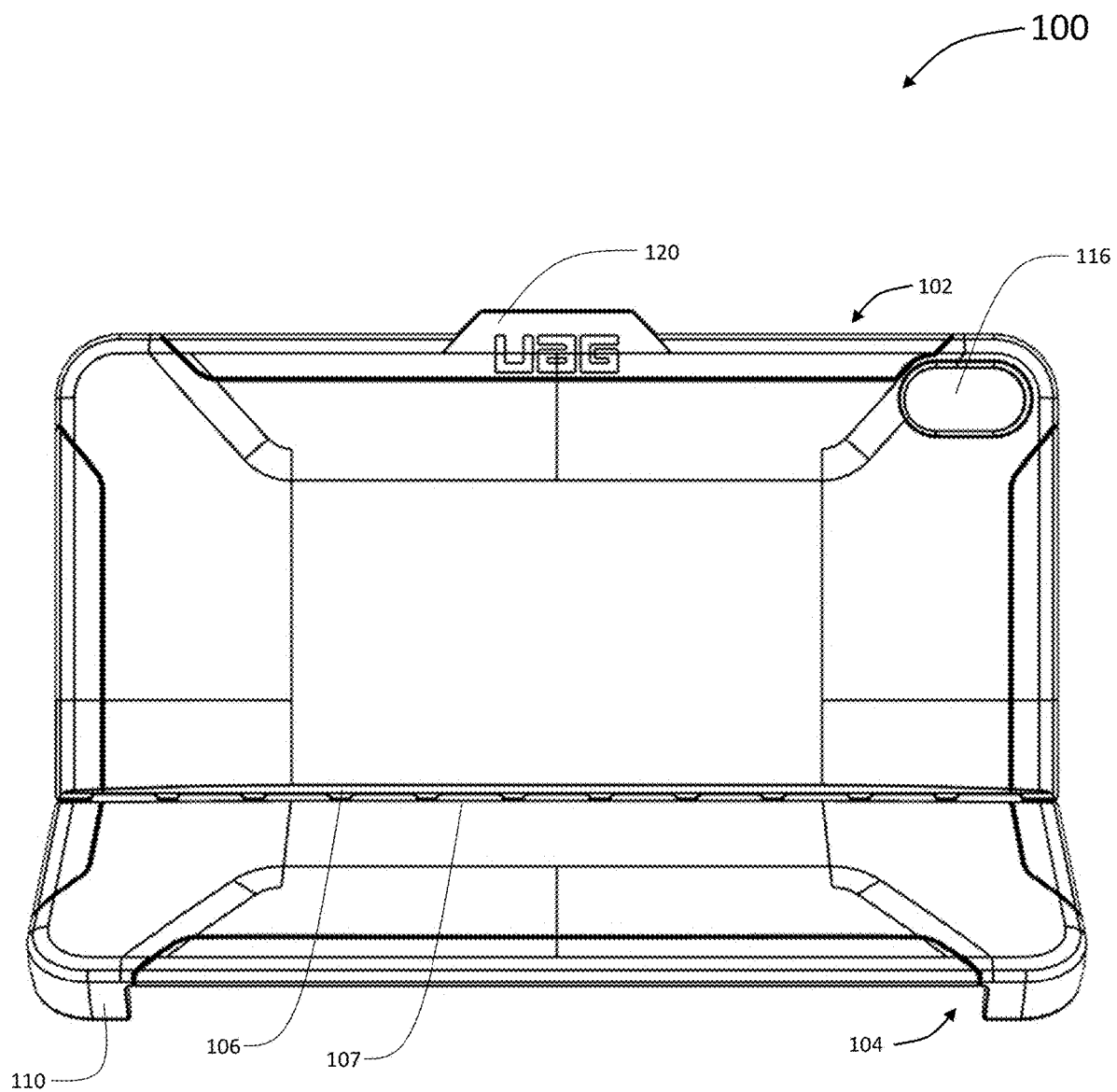
FIG. 11 is a rear elevation view of the case of FIG. 9.
Figure 12:
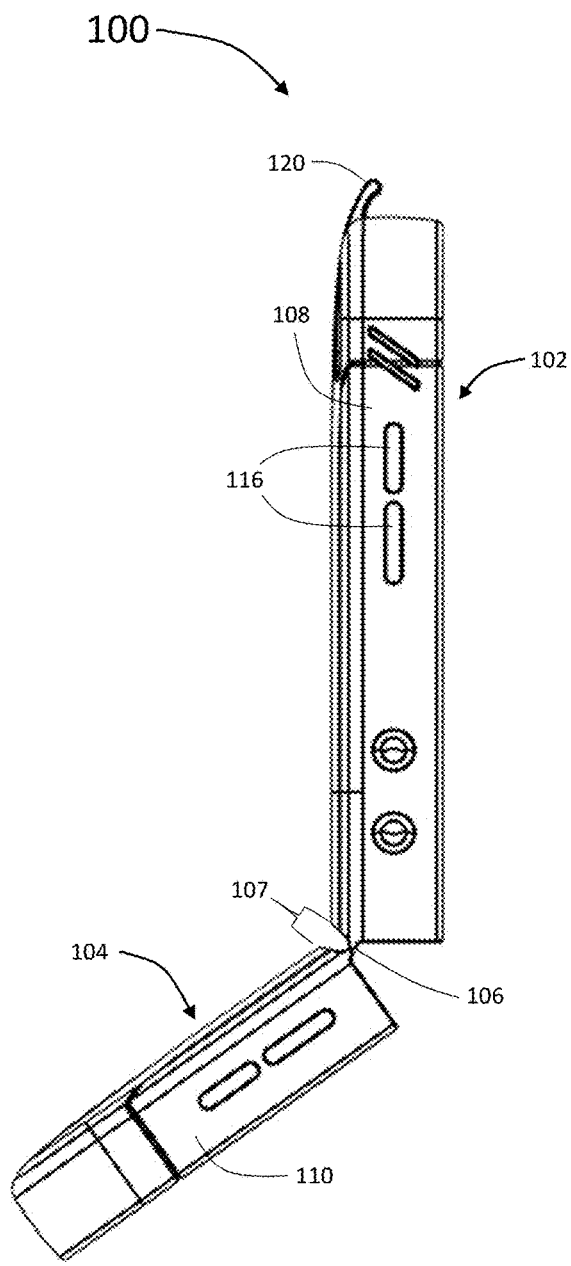
FIG. 12 is a left elevation view of the case of FIG. 9.
Figure 13:
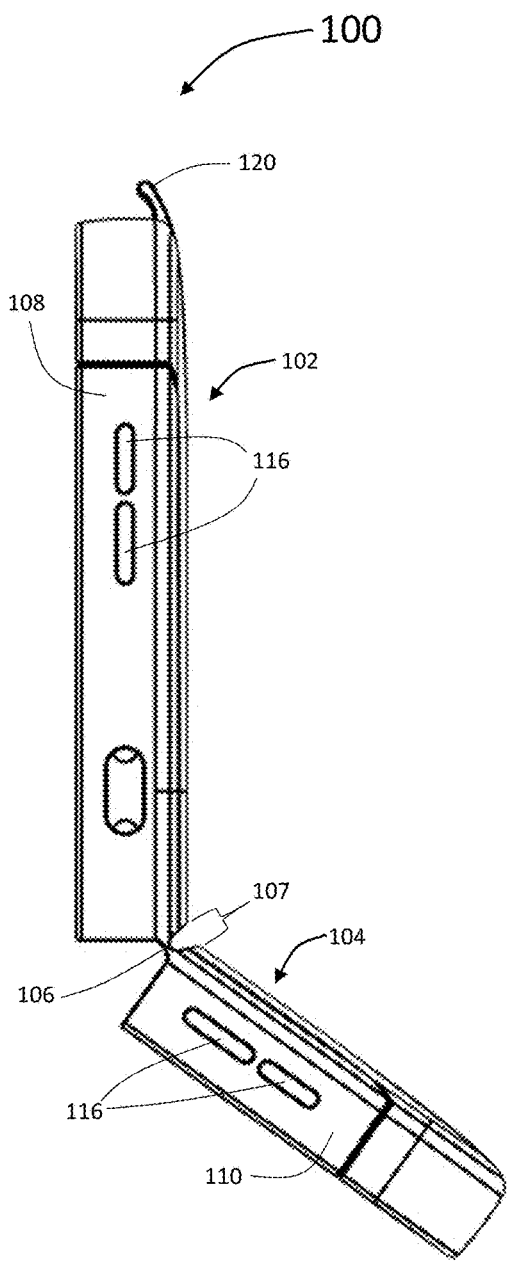
FIG. 13 is a right elevation view of the case of FIG. 9.
Figure 14:
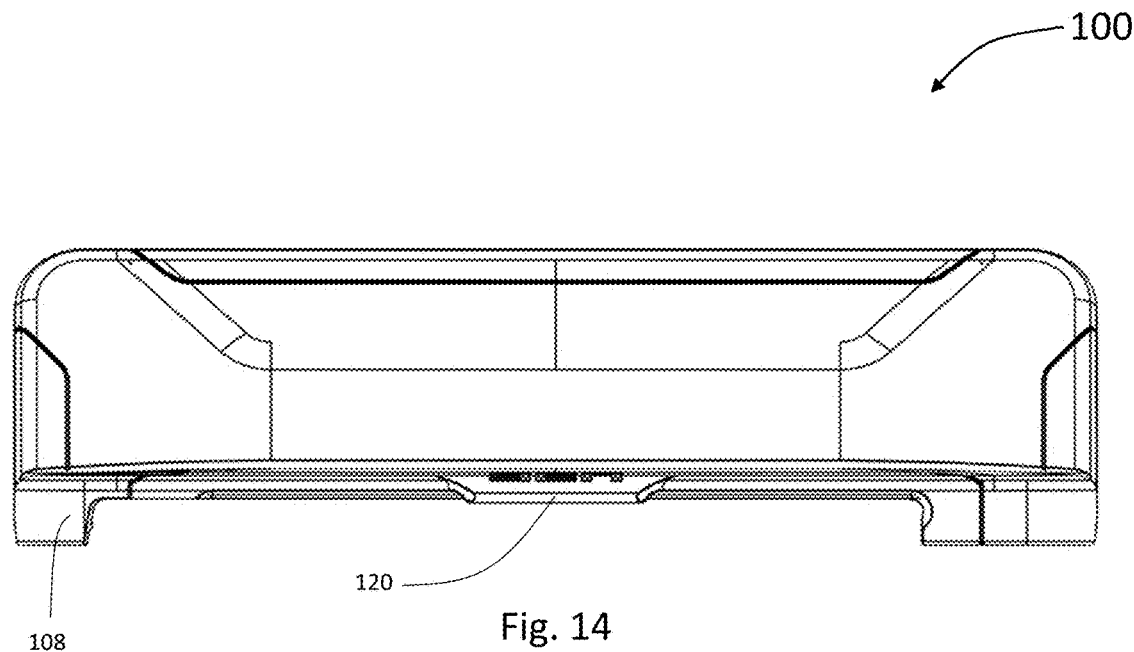
FIG. 14 is a top plan view of the case of FIG. 9.
Figure 15:
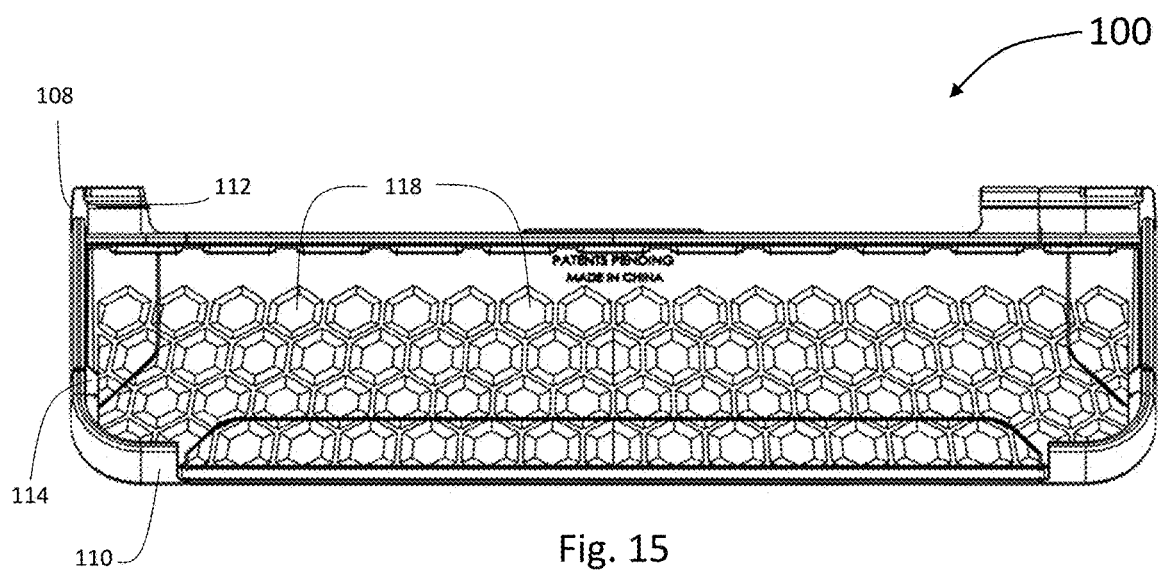
FIG. 15 is a bottom plan view of the case of FIG. 9.

In some embodiments, the protective case 100 comprises a main body (comprised of upper portion 102 and lower portion 104), said main body being generally rectangular in shape and including a length and a width, and an axis associated with each. In some embodiments, the width of the case 100 is a greater distance than the length of the case 100. In some embodiments, the main body has opposing interior and exterior surfaces, as seen in FIGS. 2 and 3. In some embodiments, the interior and/or exterior surfaces are textured. In some embodiments, this texture is patterned in a nested, interlocking hexagonal pattern as in FIG. 1, while in others the texture is patterned in a different pattern, such as that show in FIG. 23. In some embodiments, the main body segment defines one or more discrete relief area 105, such as an aperture, an area of thinner material, or the like. In some embodiments, a plurality of relief areas 105 are positioned linearly across a substantial portion of the body segment.

In some embodiments, the relief areas 116 define a relief line across a width of the main body segment. In some embodiments, such relief line is a living hinge. In some embodiments, a perimeter wall (108, 110) extends from the interior surface, generally coinciding with the perimeter of the main body. In some embodiments, the perimeter wall (108, 110) is continuous along the entire perimeter, except for interruption in the perimeter wall that coincides with the linear relief line defining the living hinge 106, such that the perimeter wall interruption allows for the operability of the living hinge 106 created by the relief line. Thus, in some embodiments, the perimetral wall (108, 110) can be considered two elements—a first perimeter wall 108 that corresponds to the upper portion 102 of the case, and a second perimeter wall 110 that corresponds with the lower portion 104 of the case.

In some embodiments, the case 100 is dimensioned to receive one or more electronic device 10 and/or accessories (cover 22, keyboard 24, stylus 30, etc.). In some embodiments, the case 100 is dimensioned to receive and conform to a tablet. In some embodiments, that tablet is an iPad. In some embodiments, the electronic device 10 is coupled with a cover 22, which the upper portion 102 and lower portion 104 and corresponding perimeter walls (108, 110) are configured to receive. In some embodiments, the case 100 and the perimeter walls (108, 110) are configured to additionally receive a keyboard 24 for use with the electronic device 10.

Figure 18:
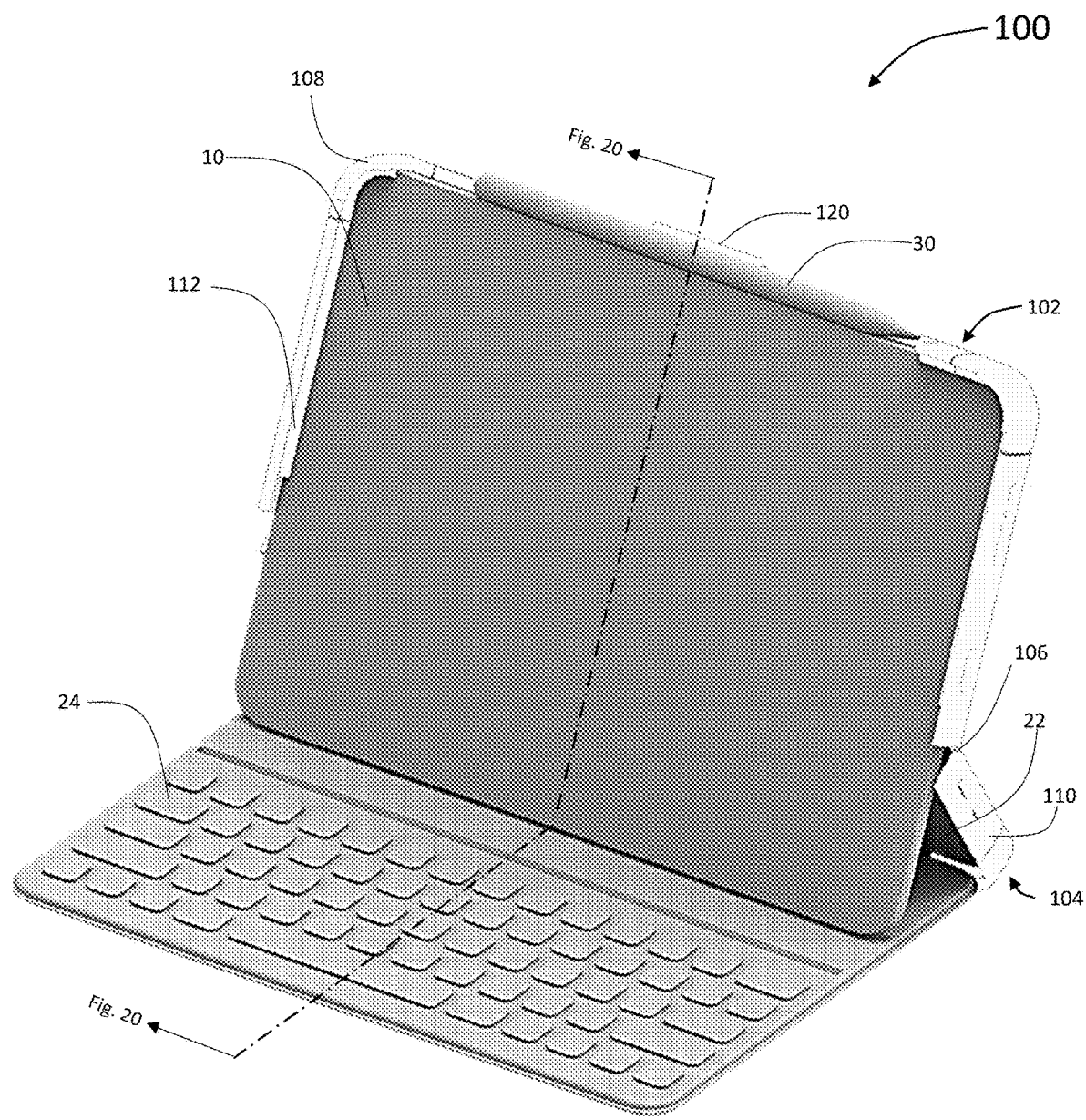
FIG. 18 is a perspective view of the case of FIG. 1, the case being in a deployed configuration and shown engaged with an electronic device and a keyboard accessory.
Figure 20:
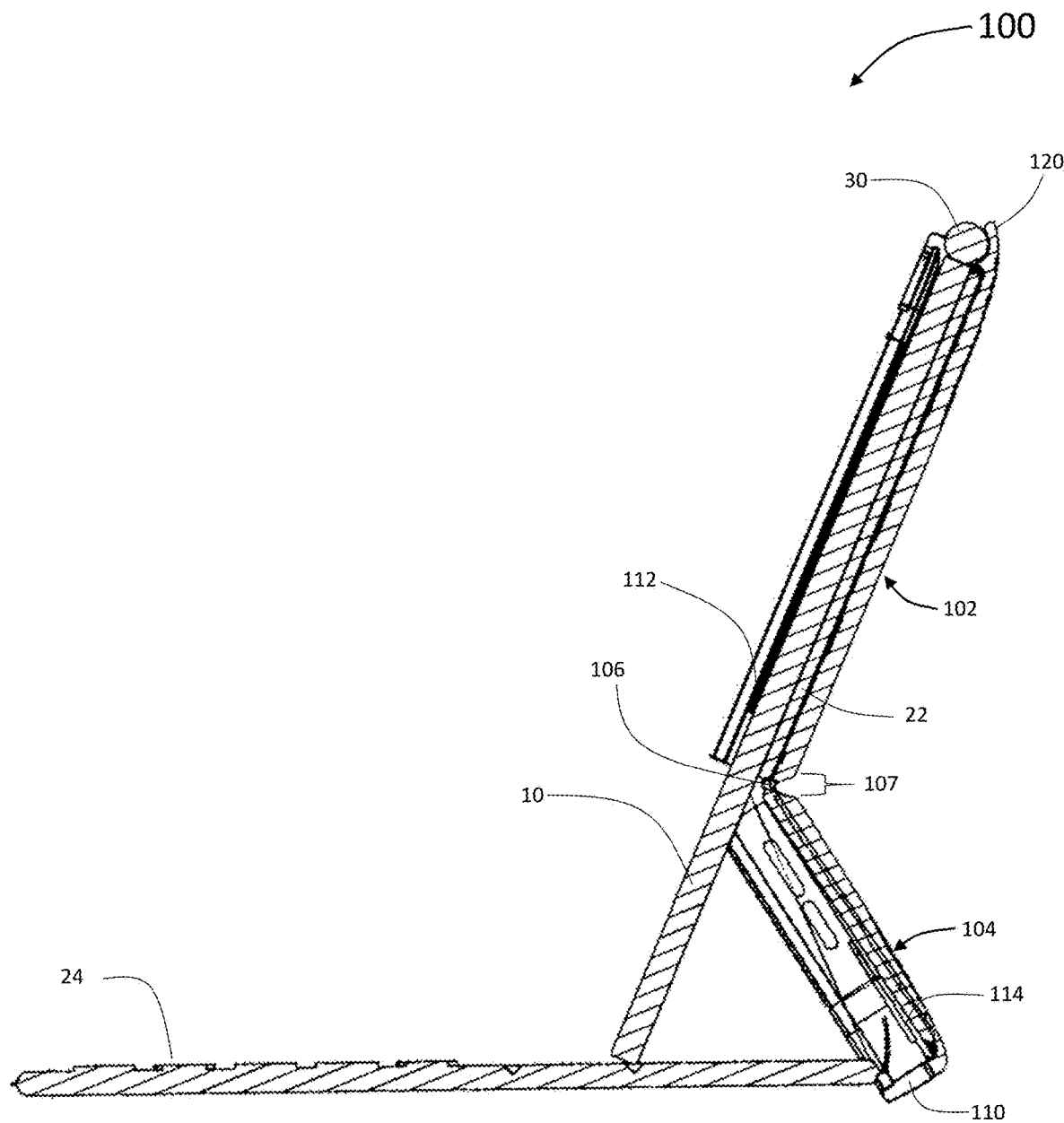
FIG. 20 is a sectional view of the case of FIG. 18, taken along section line FIG. 18 shown in FIG. 18.
Figure 21:
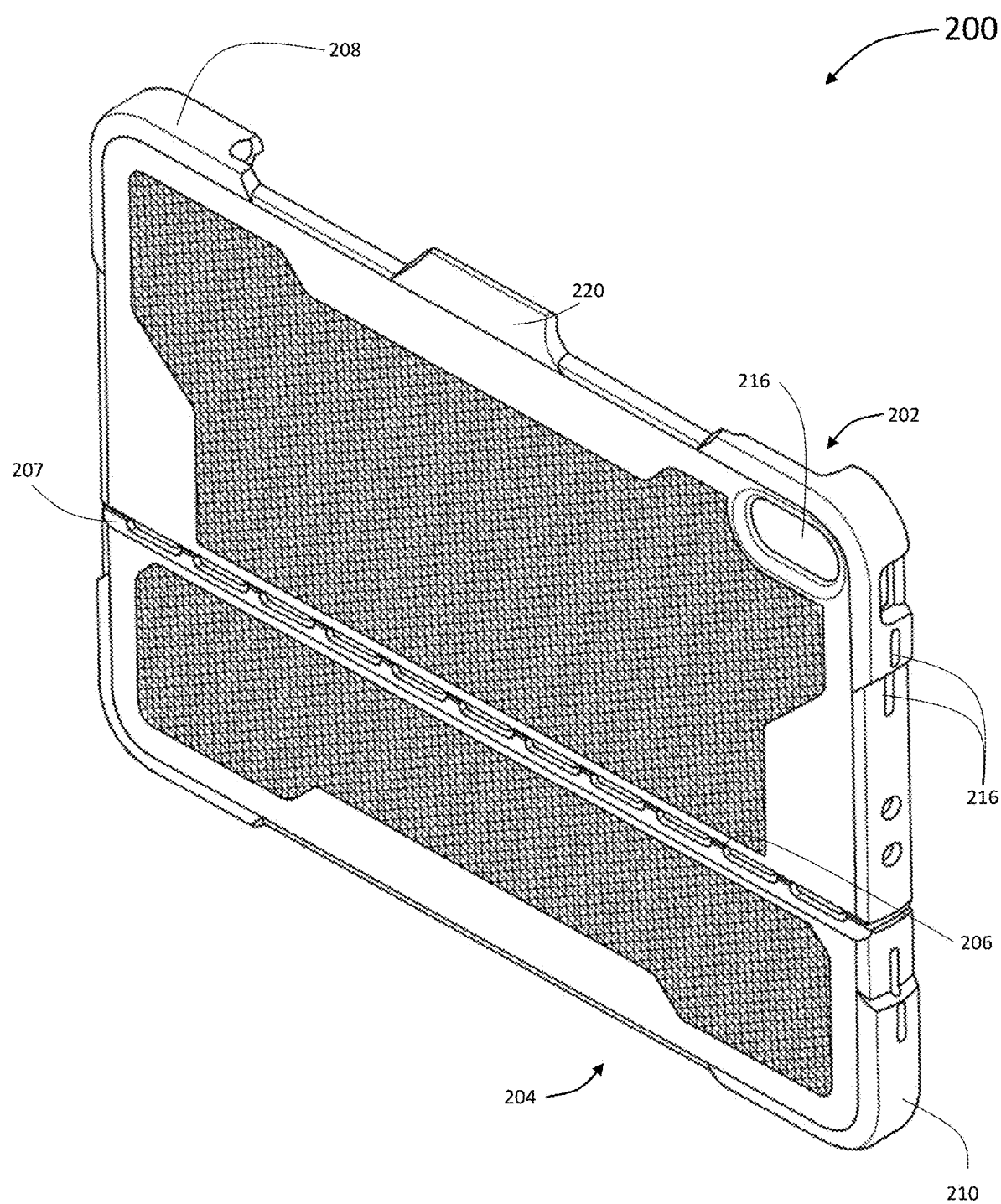
FIG. 21 is a rear perspective view of a case according to a second embodiment of the present invention, the case shown in a stowed configuration.
Figure 22:
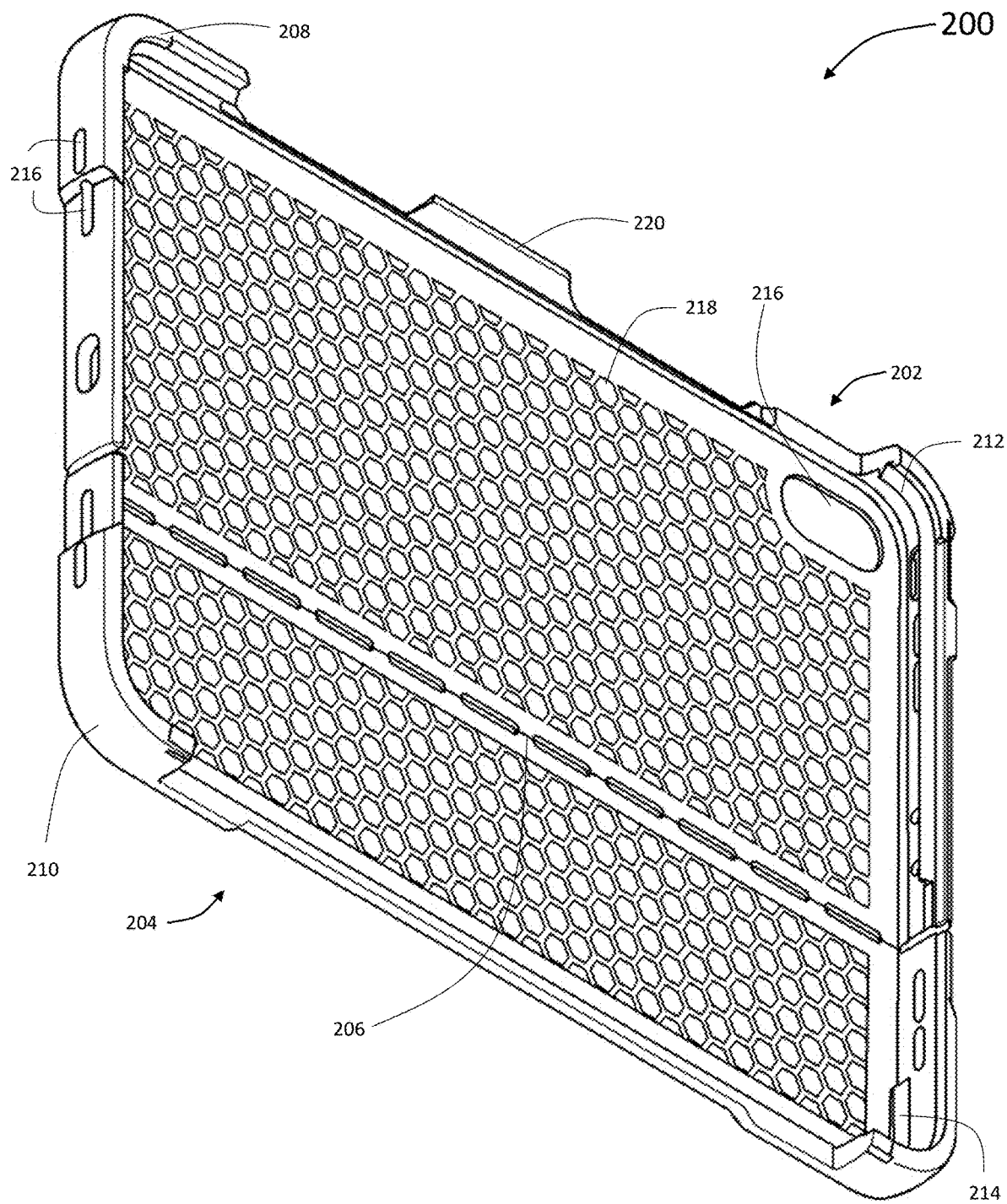
FIG. 22 is a front perspective view of the case of FIG. 21.

In some embodiments, secured within the case 100 is an accessory associated with the electronic device 10, said accessory being a keyboard cover (22, 24). In some embodiments, the keyboard 24 and cover 22 wrap substantially around an edge of the electronic device 10, with a front and back segments which rest against the front and back of the electronic device 10, respectively. In some embodiments, a front segment of the keyboard cover defines a keyboard with connection points for receiving a lower edge of the electronic device, such as depicted in FIG. 18 and FIG. 20. In some embodiments, a living hinge exists in the back segment of the cover 22, such that the keyboard 24 is capable of being deployed by rotating the keyboard 24 around said living hinge in the cover 22 and slotting a lower edge of the electronic device 10 into a connection point associated with the keyboard 24. In some embodiments, such a configuration is a deployed configuration, and leaves a wedge shape, defined by the angle created by the electronic device 10, the angle of living hinge of the cover 22, an angle of intersection of the two segments of the cover 22, and the segments of the electronic device 10 and cover 22 extending there between.

In some embodiments, the case 100 includes one or more void 105. In some embodiments, a plurality of voids 105 are positioned linearly along an axis of the main body of the case 100. In some embodiments, the voids 105 define a relief line across the main body of the case 100. In some embodiments, the relief line defines a living hinge 106. In some embodiments, the living hinge 106 separates the main body of the case 100 into an upper portion 102 and a lower portion 104. In some embodiments, the living hinge 106 substantially aligns with a hinge associated with a cover 22. In some embodiments, an exterior surface of the case includes a trench 107. In some embodiments, the trench 107 is substantially aligned with the relief line, such as to further define a living hinge 106 associated with the main body of the case 100. In some embodiments, the trench 107 defines the upper bound of rotational movement of the lower portion 104 with respect to upper portion 102 by way of the living hinge 106 by restricting rotational movement beyond a certain point. In some embodiments, the restriction of rotational movement beyond such certain point provides support for supporting the electronic device in a usable position, such as in a vertically (slanted) orientation associated with use of the tablet with a keyboard. In some embodiments, the living hinge is defined by the trench 107 and/or by opposed inner and outer trenches.

In some embodiments, the cover also includes one or more apertures 116 associated with one or more points of interest associated with the electronic device 10 stored within. In some embodiments, such one or more point of interest is a camera, a screen, a sensor, a speaker, or the like. Such apertures 116, in some embodiments, are also defined by the first 108 and/or second 110 perimetral wall, corresponding to a point of interest.

In some embodiments, the case 100 includes a perimeter wall (108, 110). In some embodiments, the perimeter wall (108, 110) protrudes from the interior wall, running substantially along the perimeter of the main body of the case 100. In some embodiments, the perimeter wall (108, 110) is continuous along the perimeter of the main body, except for brief interrupts which coincide with the relief line defining a living hinge 106, as can be seen in FIG. 1.

In some embodiments, the perimeter wall (108, 110) includes one or more apertures 116, which are associated with one or more points of interest associated with the electronic device 10 stored within the case 100. In some embodiments, such one or more point of interest is a charging port, a speaker port, exterior button, or the like. In some embodiments, one side of the perimeter wall (108, 110) is configured to hold a stylus accessory 30. In some embodiments, the perimeter wall (108, 110) contains an accessory guide surface 120 which to secure a stylus 30 accessory by. In other embodiments, the perimetral wall (108, 110) does not extend around the entirety of the case 100, however the case still includes an accessory guide surface 120 to secure a stylus 30 by.

Figure 23:
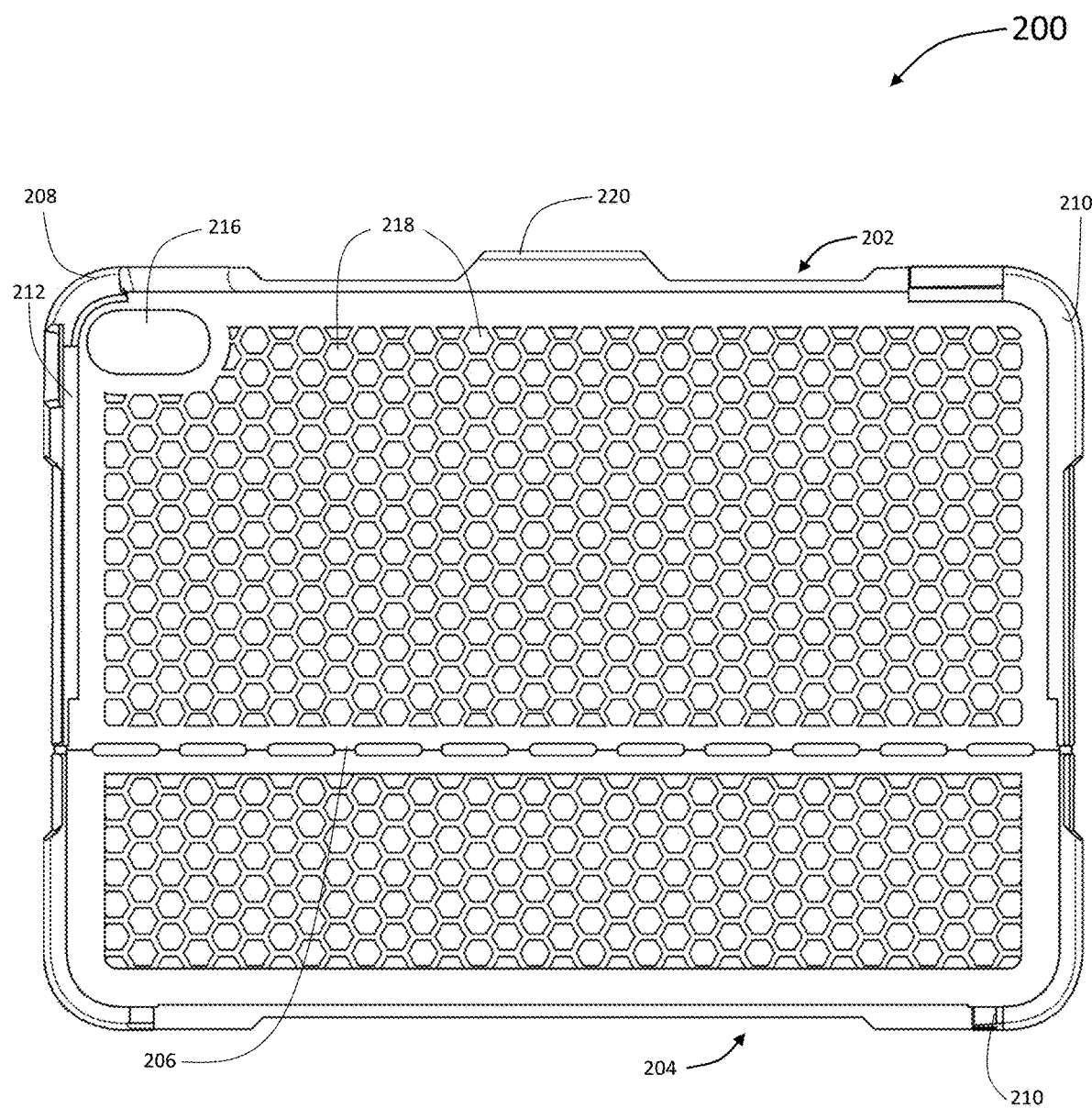
FIG. 23 is a front elevation view of the case of FIG. 21.
Figure 24:
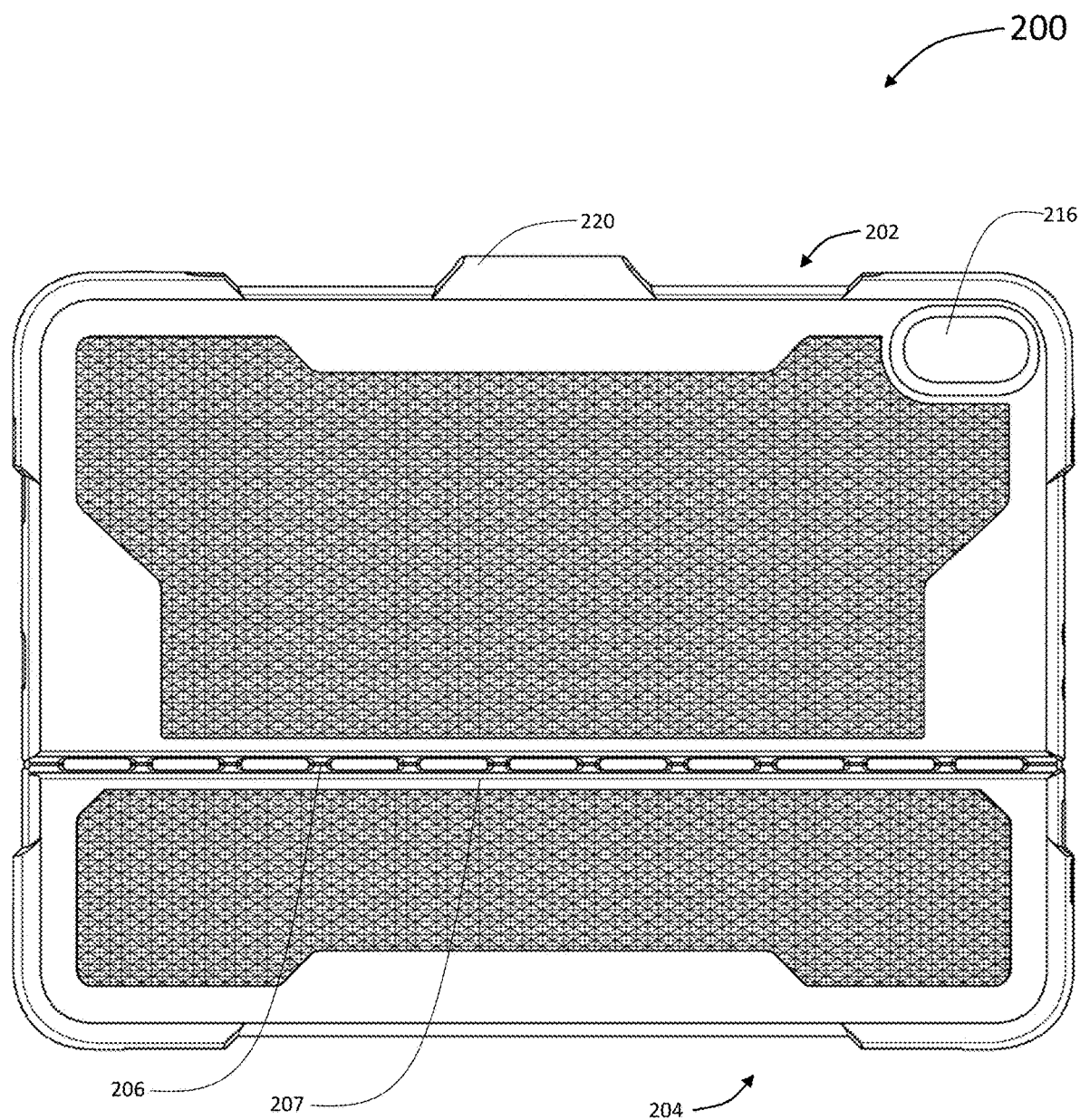
FIG. 24 is a rear elevation view of the case of FIG. 21.
Figure 25:
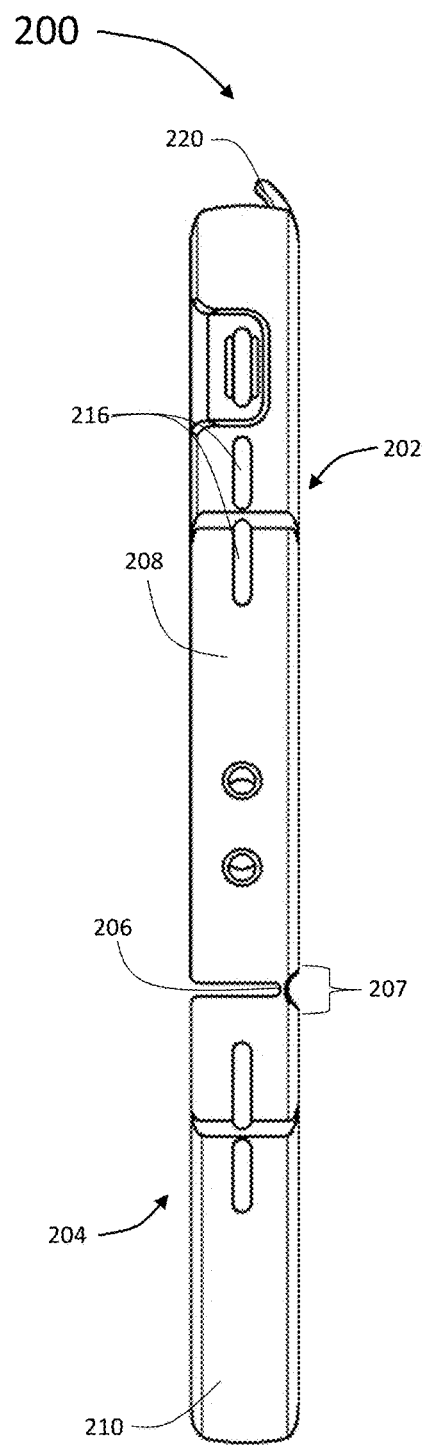
FIG. 25 is a left elevation view of the case of FIG. 21.
Figure 26:
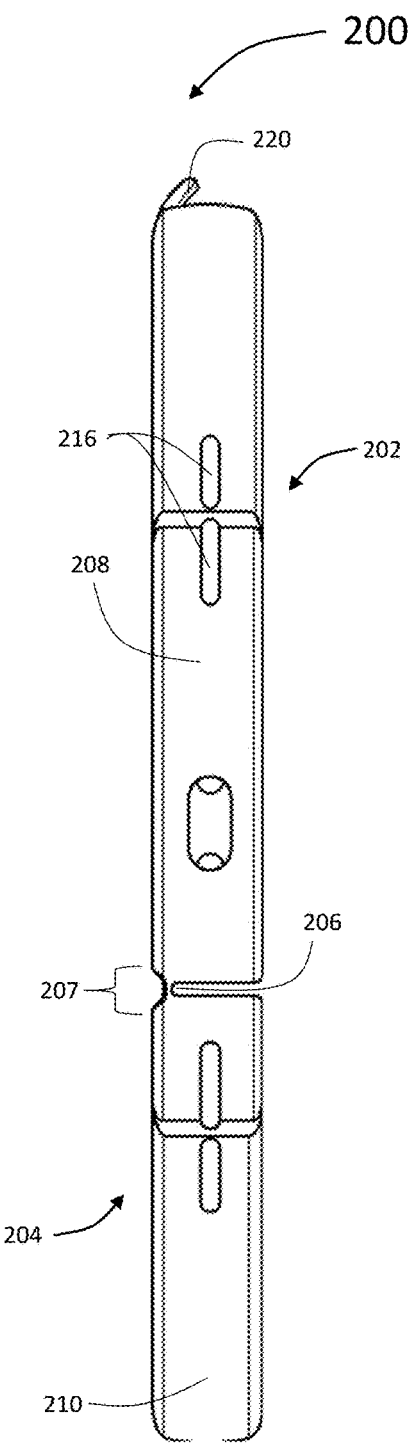
FIG. 26 is a right elevation view of the case of FIG. 21.
Figure 27:
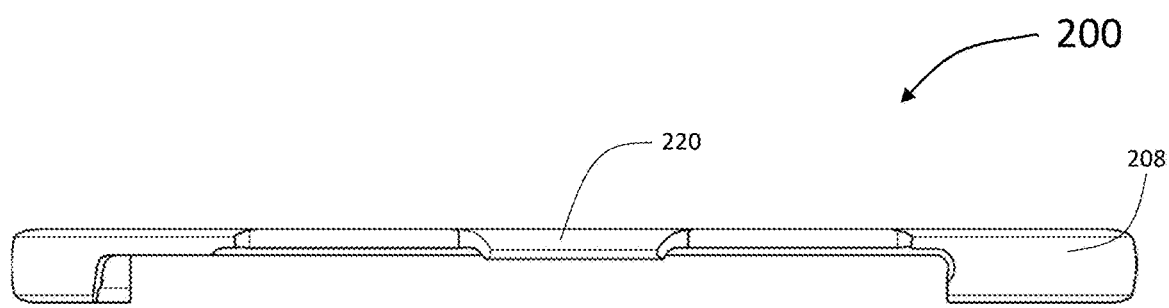
FIG. 27 is a top plan view of the case of FIG. 21.
Figure 28:
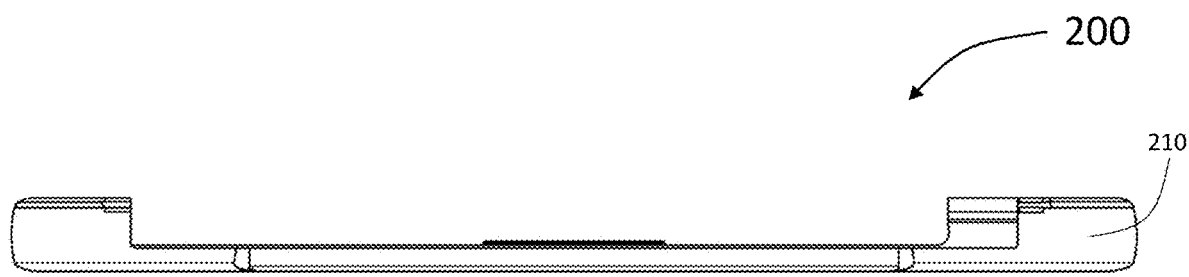
FIG. 28 is a bottom plan view of the case of FIG. 21.
Figure 29:
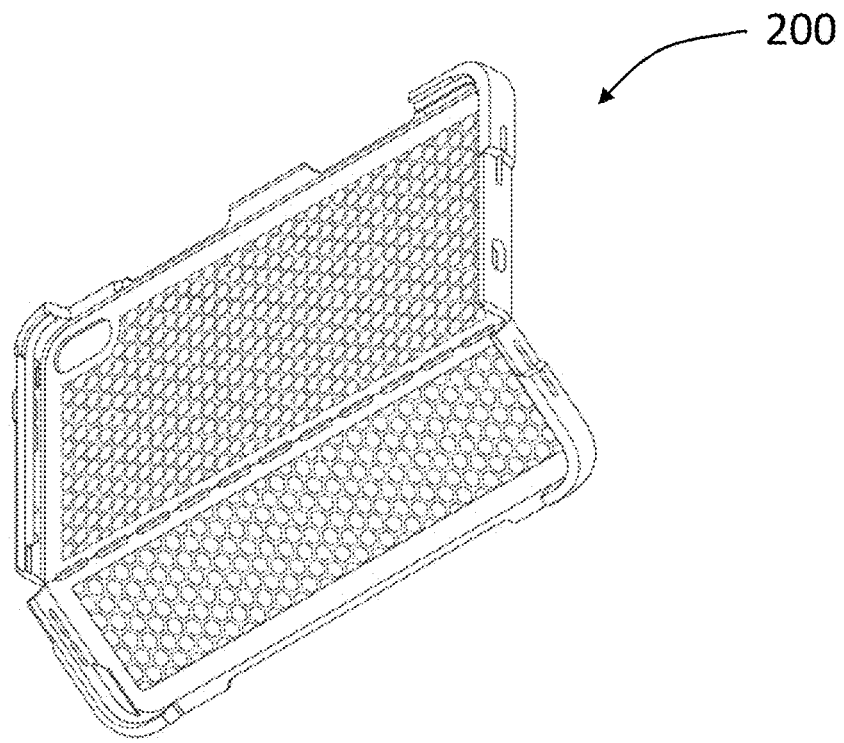
FIG. 29 is a front perspective view of the case of FIG. 21, the case shown in a deployed configuration.
Figure 30:
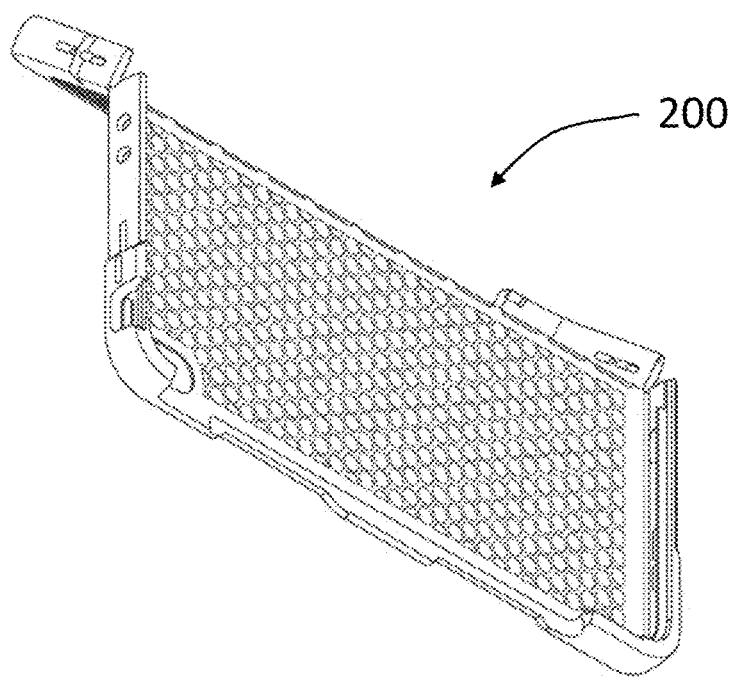
FIG. 30 is a front perspective view of the case of FIG. 29, shown from a different perspective than from FIG. 29.
Figure 31:
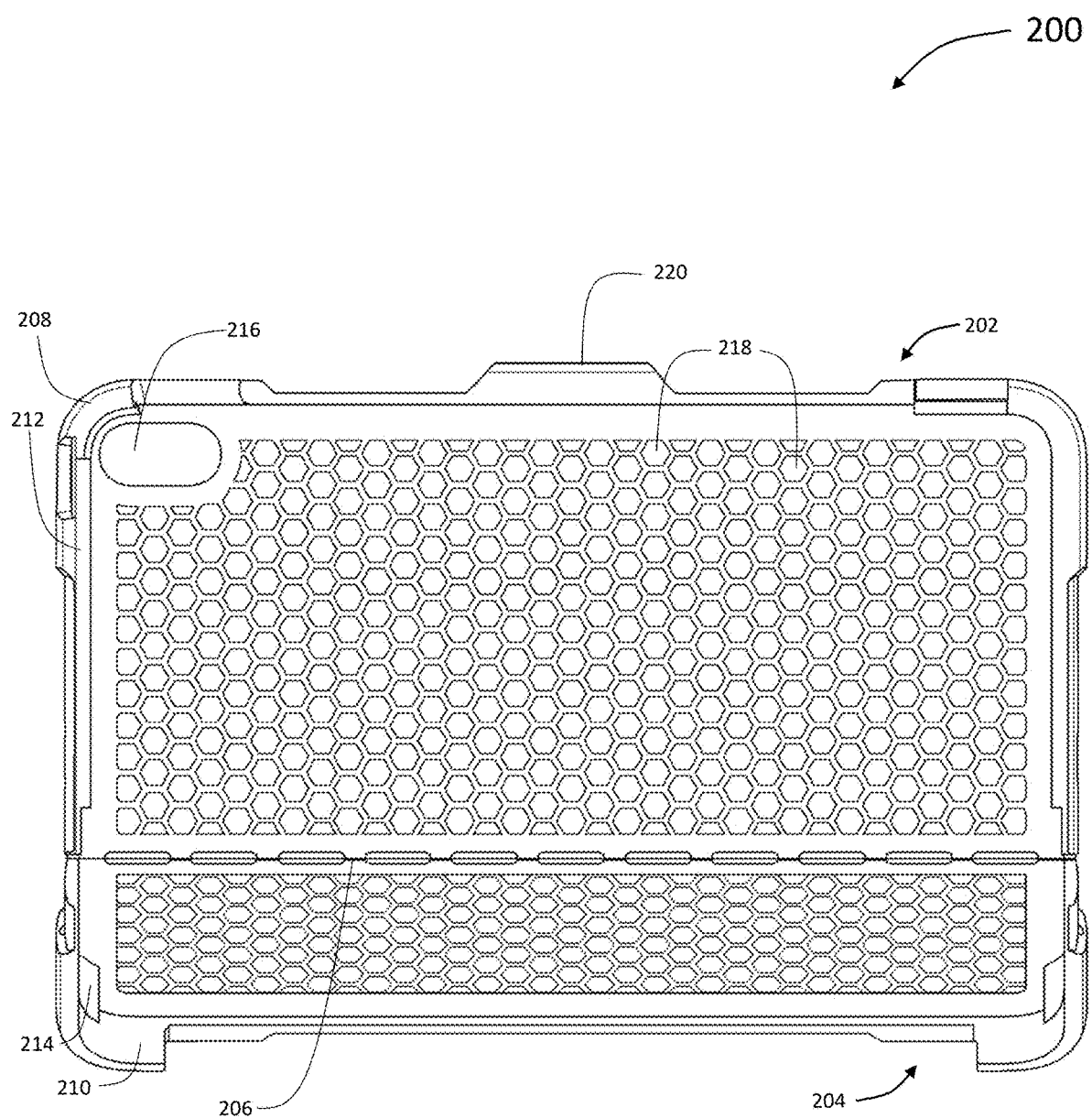
FIG. 31 is a front elevation view of the case of FIG. 29.
Figure 32:
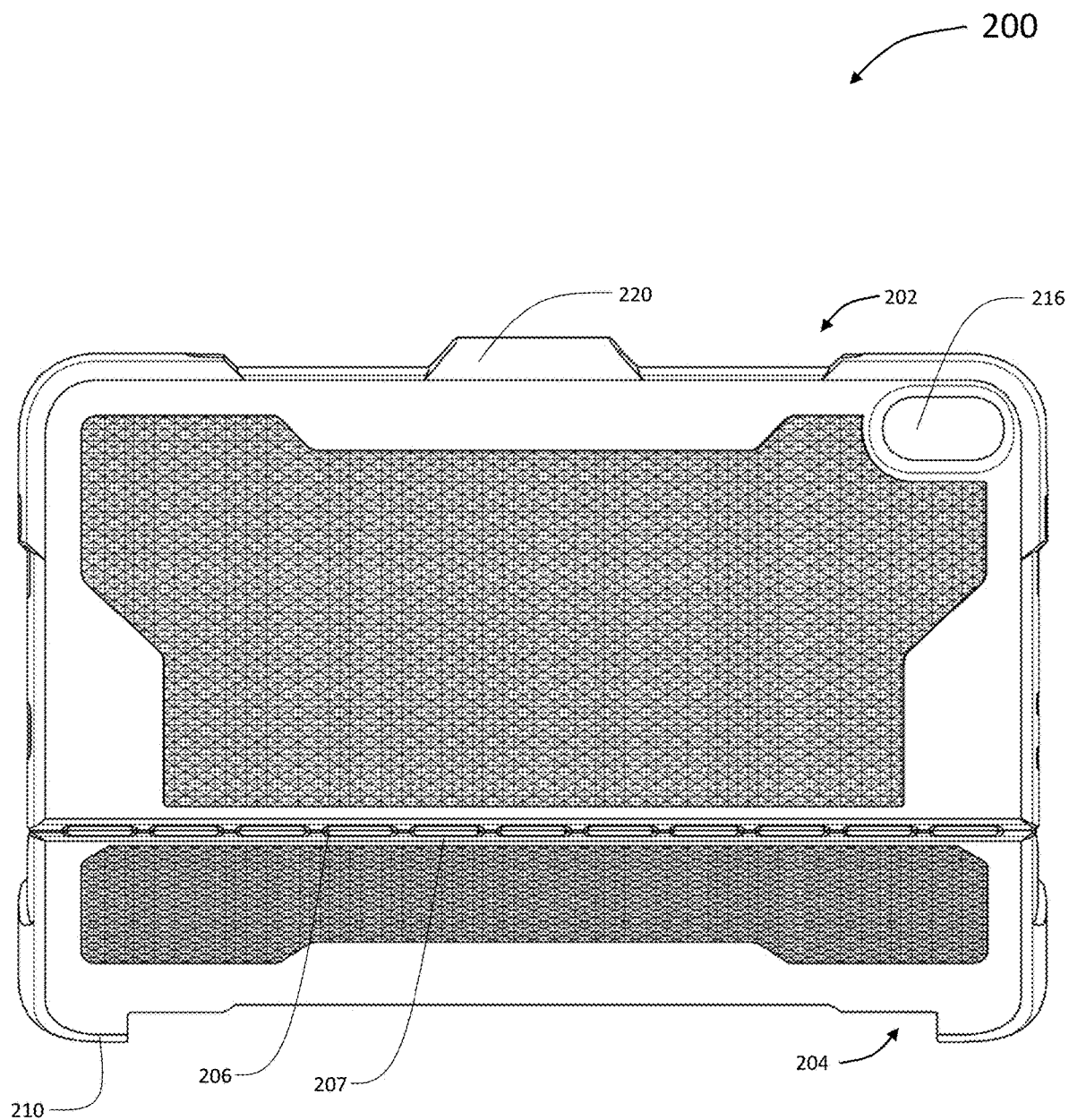
FIG. 32 is a rear elevation view of the case of FIG. 29.
Figure 33:
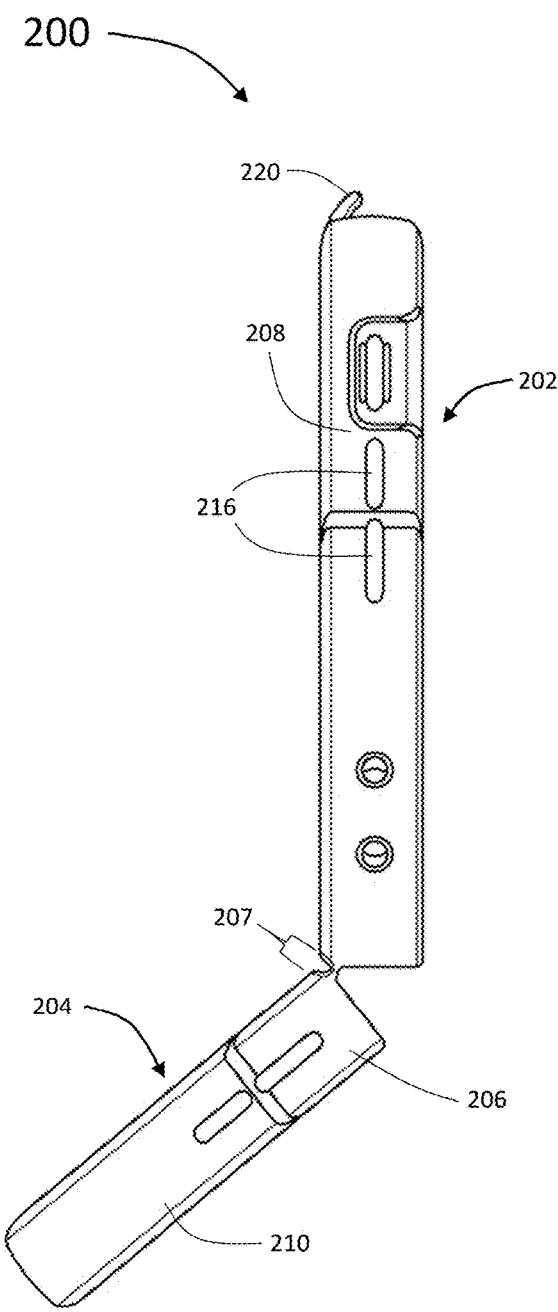
FIG. 33 is a left elevation view of the case of FIG. 29.
Figure 34:
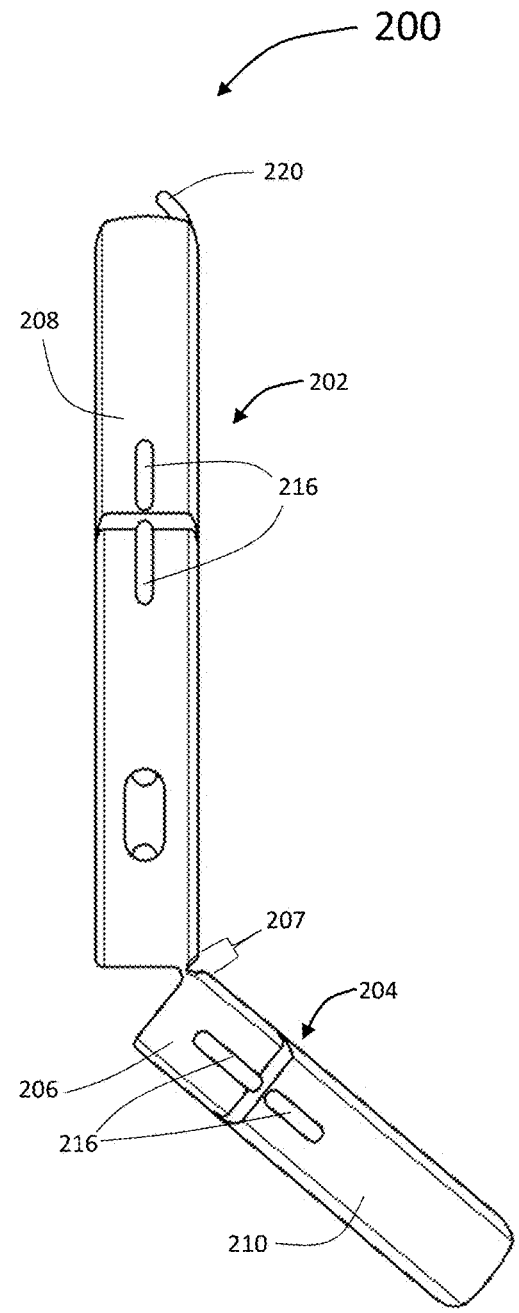
FIG. 34 is a right elevation view of the case of FIG. 29.
Figure 35:
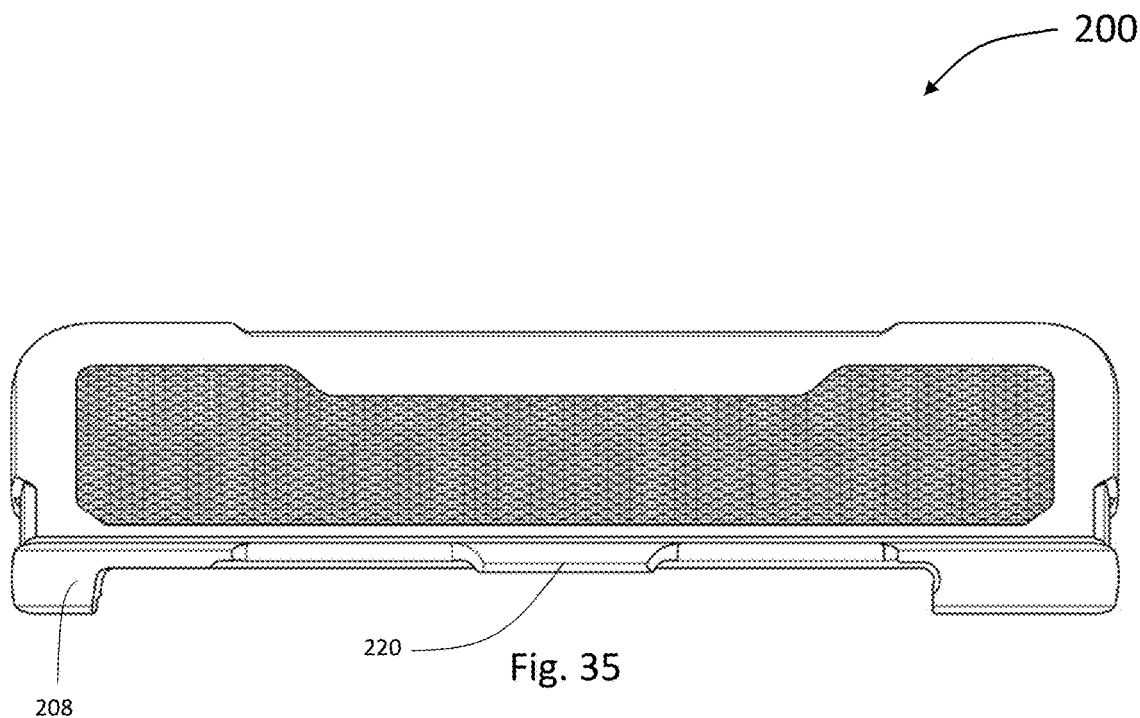
FIG. 35 is a top plan view of the case of FIG. 29.
Figure 36:
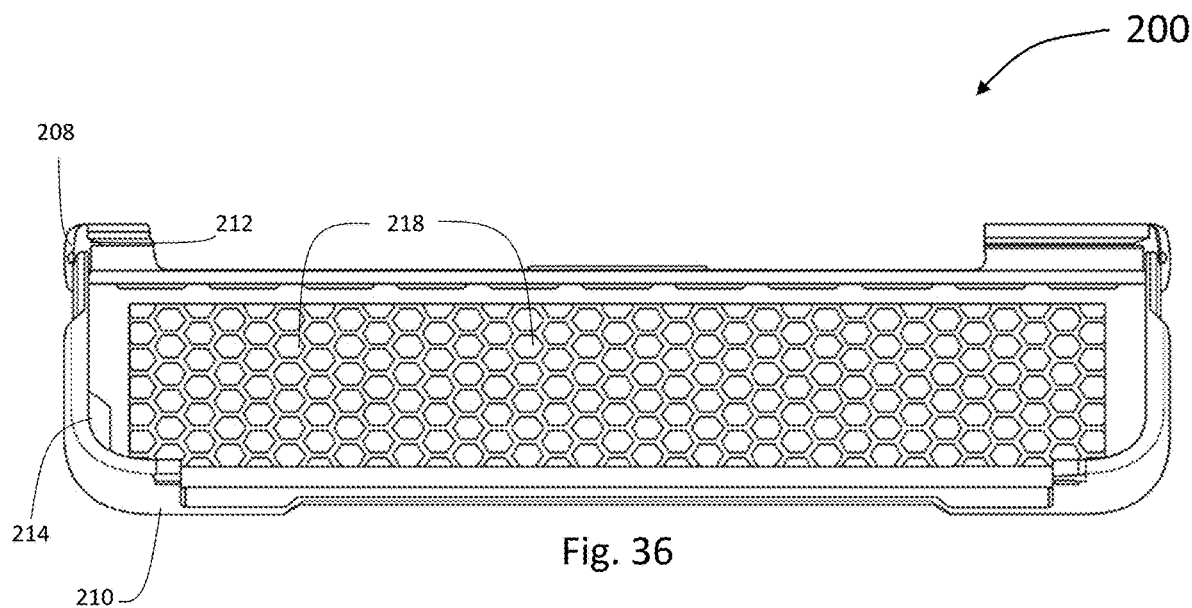
FIG. 36 is a top plan view of the case of FIG. 29.

In some embodiments, the perimeter wall (108, 110) includes one or more guide surfaces (112, 114) to selectively restrict movement of a stored electronic device 10. In some embodiments, the guide surfaces (112, 114) are continuous around the entirety of the perimeter wall (108, 110). In some embodiments, the guide surfaces (112, 114) are discontinuous around the perimeter wall, as shown in the Figures, such that only certain portions of the perimeter wall (112, 114) have guide surfaces (112, 114) to restrict movement of a stored electronic device 10. In some embodiments, only a first perimetral wall 108 associated with an upper portion 102 of the main body segment has guide surfaces 112 configured to restrict and secure an electronic device 10, such that a lower portion 104 may move relatively freely about the living hinge 106 without disrupting the interfacing of an upper portion 102 and an electronic device 10. In some embodiments, a similar structure exists for one or more accessories, wherein only a portion of the perimeter wall maintains guide surfaces for secure the accessories, such as a cover 22 and/or a keyboard 24. It will be appreciated that either the upper 102 or lower 104 portion may selectively possess and/or omit securing guide surfaces (112, 114) to accommodate slight variations in configuration, as shown in FIG. 23.

In some embodiments, the main body segment is configured for rotational displacement about the living hinge 106. In some embodiments, this rotational displacement allows a lower portion 104 of the main body segment to rotate about the living hinge 106 relative to an upper portion 102 of the main body segment. In some embodiments, when the case 100 holds one or more electronic device 10 and/or accessory (22, 24), the lower portion 104 of the main body segment disengages with one or more electronic device 10 and/or accessory upon rotation about the living hinge 106, such that the device 10 and/or accessory remains engaged with the upper portion 102 during the rotation. In some embodiments, the upper portion 102 of the main body segment disengages with one or more electronic device 10 and/or accessory upon rotation of the living hinge 106, such that the device 10 and/or accessory remains engaged with the lower portion 104 during the rotation.

Figure 17:
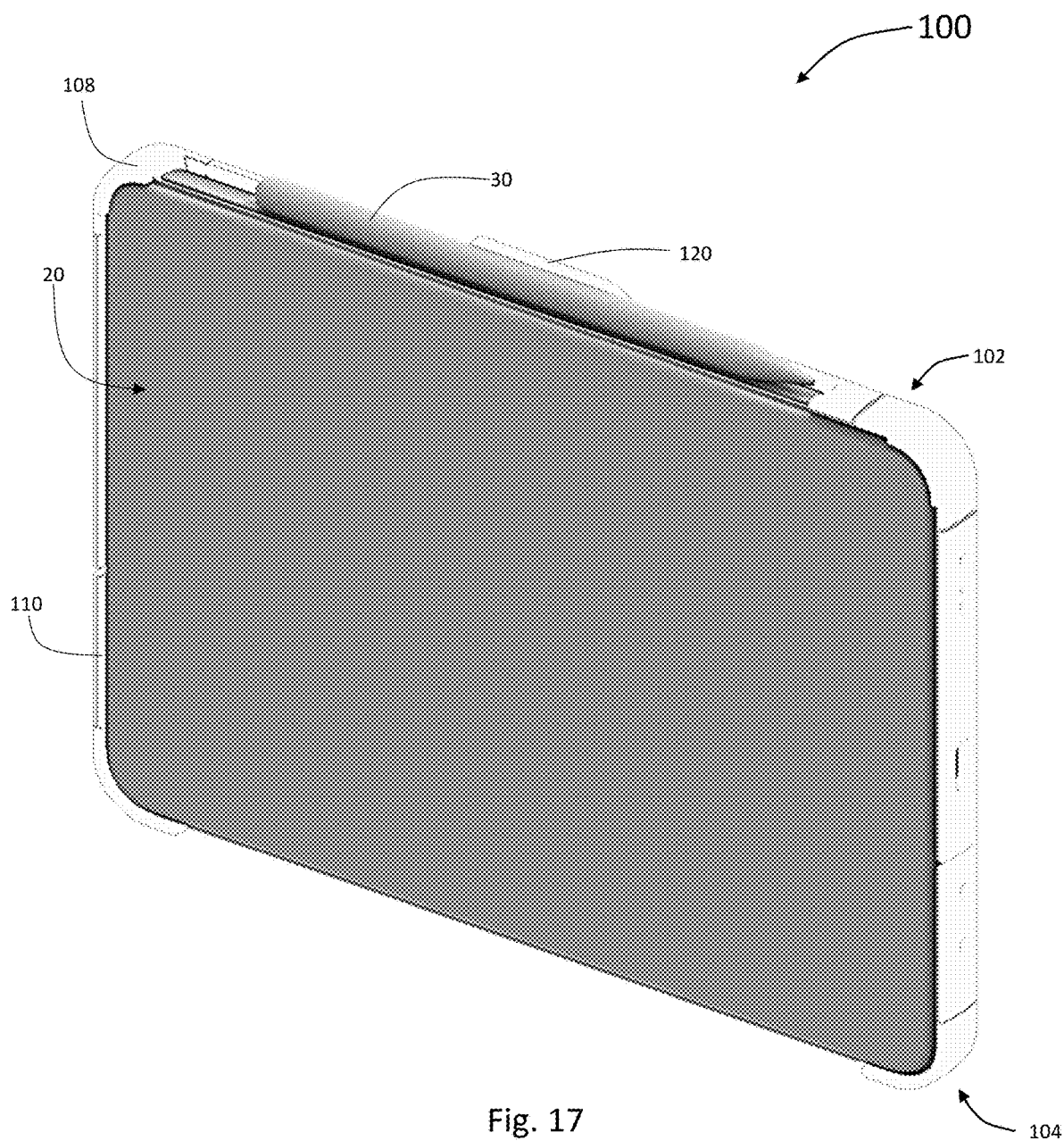
FIG. 17 is a perspective view of the case of FIG. 1, the case being in a stowed configuration and shown engaged with an electronic device.

In some embodiments, the case 100 is configurable in stowed and deployed configurations, as shown in FIGS. 1-7 (stowed) and FIGS. 9-15 (deployed). In some embodiments, the case 100 is movable between a stowed and a deployed configuration. In some embodiments, while in the stowed configuration, the living hinge 106 is unrotated, as such both the upper 102 and lower portions 104 engage with all of the one or more electronic device 10 and/or accessories (22, 24) within the case 100, as shown in FIG. 17. In some embodiments, an electronic device 10 with a cover 22 are secured within the case 100, such that the cover 22 or the electronic device 10 are the article within the case 100 closest to the interior wall of the case 100. In some embodiments, a keyboard 24 is the article within the case 100 furthest form the interior wall of the case 100, such that at least an electronic device 10 resides within the case 100 closer to the interior wall than the keyboard 24. In some embodiments, the accessory is a cover 22, which wraps around the electronic device 10, the entire assembly of which subsequently reside securely with the case 100.

Figure 19:
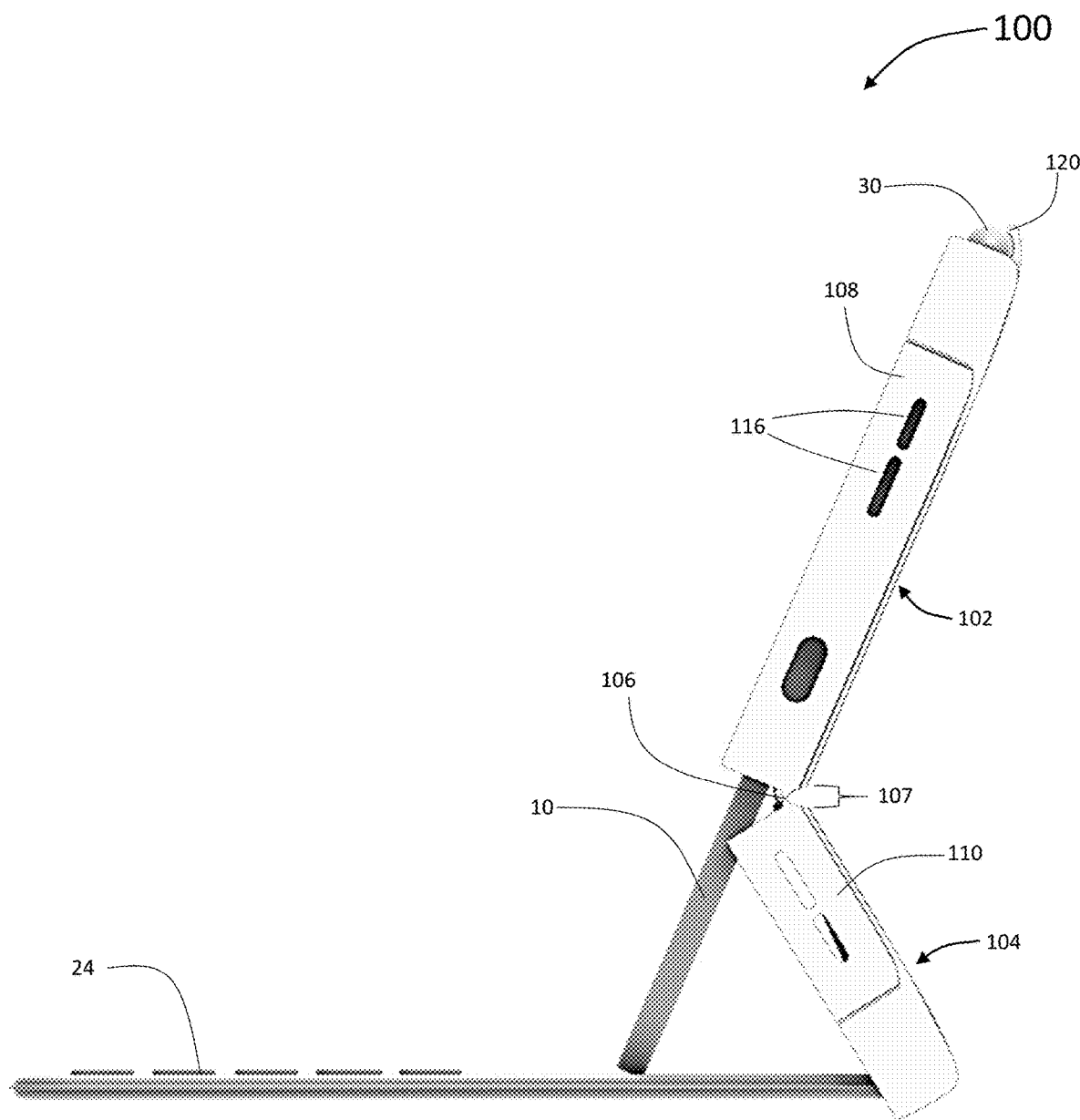
FIG. 19 is a right elevation view of the case of FIG. 18.

In some embodiments, moving the case 100 from a stowed to a deployed configuration involves rotating the lower portion 104 about the living hinge 106 relative to the upper portion 102. In some embodiments, upon first rotating the lower portion 104 about the living hinge 106, the keyboard 24 disengages from the upper portion 102 while remaining engaged with the lower portion by way of its attachment to cover 22, as shown in FIGS. 19 and 20. In some embodiments, at the same time, the electronic device 10 and/or cover 22 disengage from the lower portion 104 while remaining engaged with the upper portion 102. In some embodiments, the cover 22 is engaged within the lower portion 104 in a manner that allows for the end of the cover 22 associated with the lower portion 104 to rotate within the lower portion 104 without disengaging from the lower portion 104. It will be appreciated that while rotating the lower portion 104 relative to the upper portion, the keyboard 24 rotates within the lower portion 104 so as to "swing" outward from the upper portion 102 of the main body segment away from the screen of the electronic device 10 and clear the profile of the other accessories extending from upper portion 102. In some embodiments, the rotation of the lower portion 104 continues until the bottom of the other accessories mates with a ridge or contacting point of the keyboard 24, such that the keyboard 24, the lower portion 104 of the case 100, and the remaining accessories create a triangular geometry side profile, where the keyboard 24 serves as the bottom of the triangular profile, thus defining a deployed configuration. In some embodiments, the living hinge 106 of the case accommodates this traditional function of a cover 22 while providing protection to the electronic device 10 and to the cover 22.

In some embodiments, the case is in a deployed configuration, such as in FIGS. 18-20. In some embodiments, the deployed configuration positions the lower portion 104 substantially rotated about the living hinge relative to the upper portion 102. In some embodiments, this rotation is "outward", such as to close or minimize the trench 107 in the exterior surface of the main body of the case 100. In some embodiments, the range of rotation about the living hinge 106 is significant, such that the lower portion 104 rotates about the living hinge 106 relative to the upper portion 102 until the exterior surface of the lower portion 104 meets the exterior surface of the upper portion 102. In some embodiments, the rotation is limited to one or more pre-defined alignment.

In some embodiments, when the case 100 is in the deployed configuration, the case 100, the electronic device 10, and the accessories are configured such that a user is able to utilize one or more of the accessories to control the electronic device 10. In some embodiments, the deployed configuration positions a keyboard 24 as a base, similar to a traditional laptop. In some embodiments, the keyboard 24 maintains contact with the lower portion of the case 100 while positioned as a base. In some embodiments, electronic device 10 mates with a contacting point of the keyboard 24. In some embodiments, this contacting point is relatively close to where the keyboard 24 accessory interfaces with the lower portion 104 of the main body of the case 100. In some embodiments, the contacting point is displaced linearly on the face of the keyboard 24 from where the keyboard 24 interfaces with the lower portion 104 of the main body of the case 100. In some embodiments, the keyboard 24 possesses multiple contacting points, each a different linear distance from where the keyboard 24 interfaces with the lower portion 104. In some embodiments, the interface of the electronic device 10 and the keyboard 24 creates an angle, such that a user of the keyboard 24 would have the screen of the electronic device 10 pointed slightly up towards the user when placed on a flat surface. In some embodiments, this results in an ergonomically advantageous viewing angle.

In some embodiments, when in the deployed configuration, the keyboard 24, the electronic device, and the lower portion 104 of the case 100 create a triangular or wedge shape. In some embodiments, such shape supports the electronic device 10 and maintains an ergonomically advantageous viewing angle. In some embodiments, in such a configuration, the case maintains protection over the electronic device 10 and the back of the cover 22.

In some embodiments, the deployed configuration is maintainable in one or more alignment. In a first alignment, the living hinge 106 is set at an angle to align an electronic device 10 with a first contacting point of a keyboard 24, said keyboard 24 interfacing with the lower portion 104 of the main body segment of the case 100. In some embodiments, the case 100 is movable to a second alignment. In some embodiments, moving to a second alignment involves the living hinge 106 further rotating to align the electronic device 10 with a second contacting point of a keyboard 24 while the keyboard 24 further rotates along an interface with the lower portion 104, thus changing the angle of interface between the keyboard 24 and electronic device 10. In some embodiments, no matter the alignment, the triangular or wedge shape is maintained to support the electronic device 10 at a viewing angle.

In some embodiments, the case 100 comprises a main portion, said main portion comprising a first portion, such as an upper portion 102, and a second portion, such as a lower portion 104, separated by a living hinge 106. In some embodiments, the case 100 includes a first perimetral wall 108 running at least partially along the perimeter of the first portion. In some embodiments, the case includes a second perimetral wall 110 running at least partially along the perimeter of the second portion. In yet some further embodiments, the case 100 includes at least one guide surface 112 associated with said first perimetral wall 108. In some embodiments, the case 100 includes a second guide surface 114 associated with said second perimetral wall 110.

Figure 16:
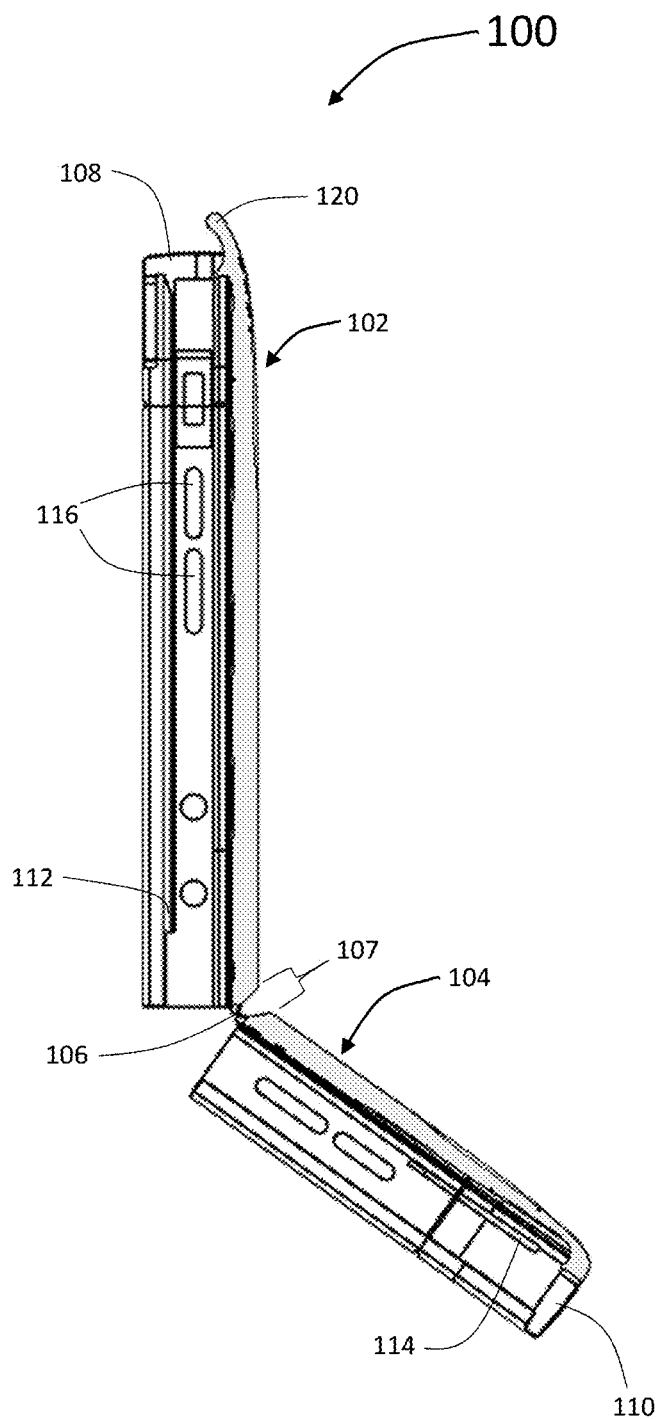
FIG. 16 is a sectional view of the case of FIG. 9, taken along section line FIG. 16 shown in FIG. 10.

Referring to FIG. 16, in some embodiments, the first guide surface 112 associated with said first perimetral wall 108 defines one or more receiving area. In some embodiments, the second guide surface 114 associated with said second perimetral wall 110 defines one or more receiving area. In some embodiments, said one or more receiving area is an electronic device receiving area 124 configured to receive at least an electronic device 20. In some embodiments, said one or more receiving area is a cover receiving area 122 configured to receive a cover 22. In some embodiments, said one or more receiving area is a keyboard receiving area 126 configured to receive a keyboard 24.

In some embodiments, said first perimetral wall 108 defines one or more aperture 116. In some embodiments, said second perimetral wall 110 defines one or more aperture 116. In some embodiments, said first portion defines one or more aperture 116. In some embodiments, said second portion defines one or more aperture 116. In some embodiments, said one or more aperture 116 corresponds with one or more feature of an electronic device 10.

In some embodiments, the case 100 includes one or more accessory guide surface 120. In some embodiments, said accessory guide surface 120 provides support for storage of a stylus 30.

In some embodiments, the case 100 includes tactile pattern 118 on at least an interior face of said first portion. In some embodiments, the case 100 includes a tactile pattern 118 on at least an interior surface of said second portion. In some embodiments, the case 100 includes a tactile pattern 118 on at least an exterior surface of said first portion. In some embodiments, the case 100 includes a tactile pattern 118 on at least an exterior surface of said second portion.

In some embodiments, the case 100 is configured to move between stowed and deployed configurations. In some embodiments, moving said case 100 between stowed and deployed configurations includes moving said second portion relative to said first portion via said living hinge 106. In some embodiments, said living hinge 106 includes one or more trench 107. In some embodiments, said trench 107 facilitates rotational displacement of the first and second portions relative to each other around said living hinge 106. In some embodiments, said trench 107 limits the maximum rotational displacement of the first and second portions relative to each other around said living hinge 106.

In some embodiments, said first guide surface resides between an electronic device 10 and a keyboard accessory 24 while in a stowed configuration. In some embodiments, said first guide surface resides between a cover 22 and a keyboard accessory 24 while in a stowed configuration. In some embodiments, said second guide surface resides between a cover 22 and an electronic device 10 while in a stowed configuration. In some embodiments, said second guide surface resides between a cover 22 and a keyboard 24 while in a stowed configuration. In some embodiments, said first guide surface is configured to constrain said electronic device 10 while moving the case 100 to a deployed configuration. In some embodiments, said first guide surface is configured to constrain said cover 22 while moving the case 100 to a deployed configuration. In some embodiments, said first guide surface is configured to constrain said electronic device 10 while in a deployed configuration. In some embodiments, said first guide surface is configured to constrain said cover 22 while in a deployed configuration. In some embodiments, first guide surface is configured to allow a keyboard 24 to disengage from said first portion while moving the case 100 to a deployed configuration.

In some embodiments, said perimetral wall of said first portion is configured to restrain an electronic device 10 while in a stowed configuration. In some embodiments, said perimetral wall of said first portion is configured to restrain a cover 22 while in a stowed configuration. In some embodiments, said perimetral wall of said first portion is configured to restrain a keyboard 24 while in a stowed configuration. In some embodiments, said perimetral wall of said first portion is configured to restrain an electronic device 10 while in a deployed configuration. In some embodiments, said perimetral wall of said first portion is configured to restrain a cover 22 while in a deployed configuration.

In some embodiments, said second guide surface is configured to constrain a cover 22 while moving the case 100 from a stowed to a deployed configuration. In some embodiments, said second guide surface is configured to allow an electronic device 10 to disengage from said second portion while moving the case 100 from a stowed to a deployed configuration. In some embodiments, said second guide surface is configured to allow a keyboard 24 to disengage from said second portion while moving the case 100 form a stowed to a deployed configuration. In some embodiments, said second guide surface is configured to restrain a cover 22 while in a deployed configuration.

In some embodiments, said perimetral wall of said second portion is configured to restrain an electronic device 10 while in a stowed configuration. In some embodiments, said perimetral wall of said second portion is configured to restrain a cover 22 while in a stowed configuration. In some embodiments, said perimetral wall of said second portion is configured to restrain a keyboard 24 while in a stowed configuration. In some embodiments, said perimetral wall of said second portion is configured to restrain a cover 22 while in a deployed configuration.

In some embodiments, said living hinge 106 is positioned to correspond with a hinge of said cover 22. In some embodiments, said living hinge 106 is configured to allow said cover 22 to conform to the movements of said case 100 while the case 100 moves between a stowed and a deployed configuration.

In some embodiments, said keyboard 24 and said cover 22 are connected via at least one connection point. In some embodiments, said electronic device 10 is stored within said cover 22. In some embodiments, said electronic device 10 is configured to rest against said keyboard 24 while stored within said cover 22.

A method of deploying the case 100 described herein is also contemplated. In some embodiments, the method includes disengaging said keyboard 24 from said first portion. In some embodiments, the method includes disengaging said keyboard 24 from said perimetral wall of said second portion. In some embodiments, the method further includes disengaging said electronic device 10 from said second portion. In some embodiments, the method further includes displacing said second portion rotationally relative to said first portion via said living hinge 106. In some embodiments, the method further includes the step of positioning said keyboard 24 to interface with the bottom of said electronic device 10. In some embodiments, said displacement causes said cover 22 to rotate along said hinge while conforming to both said first portion and said second portion. In some embodiments, said electronic device 10 is positioned in an ergonomically advantageous position when the case 100 is in the deployed configuration. In some embodiments, the keyboard 24 is accessible to a user to provide inputs to said electronic device 10 when the case 100 is in the deployed configuration. In some embodiments, said keyboard 24, cover 22, and case 100 provide an angled support stand for said device 10 when the case 100 is in the deployed configuration. In some embodiments, said angled support is configurable between two or more viewing angles. In some embodiments, the case 100 provides an angled support stand for the electronic device, such as by moving the case 100 to a deployed configuration and engaging a bottom portion of the electronic device with the keyboard.

It will be appreciated that FIGS. 1-20 depict aspects of a first embodiment 100 of the present invention, while FIGS. 21-34 depict aspects of a second embodiment 200 of the present invention. It will be appreciated that elemental callouts and indicators in the figures as they are described in the drawings are paralleled between these embodiments. By way of example, hinge 106 of the first embodiment is paralleled in the description by hinge 206 of the second embodiment. Where specific callouts are not directly described in this specification, it may be assumed the element is described by its paralleled callout.

The present invention further comprises a method of protecting two electronic devices, such as a tablet, a keyboard, and/or the like with a single case. In some embodiments, the method comprises engaging a first electronic device, such as a tablet, with a case of the present invention. In some such embodiments, the case comprises first and second portions (such as upper and lower portions) that are hingedly coupled to each other. In some embodiments, the method comprises moving the case to an opened or deployed configuration, such as by rotating the second portion relative to the first portion.

In some embodiments, the method includes engaging the first device with the case. In some such embodiments, the first portion of the case defines a first engagement feature for engaging the first portion of the case with a first portion of the first electronic device, thereby moving the first electronic device to an engaged configuration. In some embodiments, the first engagement feature defines a raceway within which the first electronic device can be slid and/or snapped into and/or out of, thereby facilitating engagement with and/or disengagement from the case, respectively. In some embodiments, the first engagement feature generates a friction interface with the first electronic device and/or otherwise inhibits disengagement of the first electronic device from the first engagement feature.

In some embodiments, the method includes securing the first device within the case. In some such embodiments, the second portion of the case is configured to rotate over a second portion of the first electronic device, thereby moving the first device to a secured configuration. In some embodiments, the case prevents or otherwise inhibits the first device from becoming disengaged from the case while the first device is in the secured configuration. In some embodiments, the case protects at least part of the first device, such as by extending at least partially around one or more edge of the first device and/or at least partially across a back portion of the first device, such that the first device is in a protected configuration. In some embodiments, the case facilitates use of the first electronic device while the first electronic device is in the protected configuration, such as by maintaining access to one or more interface feature of the first device, the one or more interface feature being one or more of a button, a port, a screen, or the like. In some embodiments, the entire front face of the first electronic device is exposed while the first electronic device is in the protected configuration, thereby facilitating visualization of and/or interface with the same.

In some embodiments, the method includes engaging the second device with the case. In some such embodiments, the first portion of the case defines a second engagement feature (similar to or distinguishable from the first engagement feature) for selectively engaging with a first portion of the second electronic device, thereby moving the second device to an engaged configuration. In some embodiments, movement of the first and second devices to respective engaged and disengaged configurations is accomplished independent of each other, such as by sliding past each other. In some embodiments, movement of the first device is at least partially dependent on movement of the second device, such as by rotating the first device through the area within which the second device resides when it is in the engaged configuration.

In some embodiments, the method includes securing the second device within the case. In some such embodiments, the second portion of the case is configured to rotate over a second portion of the second electronic device, thereby moving the second device to a secured configuration. In some embodiments, the case prevents or otherwise inhibits the second device from becoming disengaged from the case while the second device is in the secured configuration. In some embodiments, the case protects at least part of the second device, such as by extending at least partially around one or more edge of the second device such that the second device is in a protected configuration.

In some embodiments, the method includes protecting vulnerable portions of each of the first and second electronic devices. In some embodiments, the method comprises moving each of the first and second devices into respective protected configurations in such a way that a vulnerable portions of each (i.e. a screen, keys of a keyboard, etc.) face inward towards each other, thereby positioning each vulnerable portion within a protected void within the case. In some embodiments, one or more less vulnerable portion of one or more device (such as a back side of a keyboard) remains exposed. In some embodiments, moving each of the first and second devices to respective secured configurations causes the first device to be at least partially concealed (a "concealed" configuration). In some embodiments, one or more aperture defined by the case enables continued interaction with one or more interface feature of the first and/or second device, such as one or more button, port, or the like.

In some embodiments, the method includes supporting the first device. In some such embodiments the method includes disengaging the second device from the first device and moving the first device from the secured configuration to the engaged configuration. In some embodiments, the method further includes positioning the first device on a support surface while maintaining engagement of the first device with the case such that the case provides support for maintaining a desired position and/or orientation of the first device, thereby moving the first device to a supported configuration. In some embodiments, the second device includes one or more engagement feature, such as a slot or the like, that is configured to engage with the first device, such as a bottom edge of the first device, while the first device is in the supported configuration, thereby further supporting the first device. In some embodiments, the second device includes a plurality of engagement features, thereby facilitating movement of the first device between two or more supported configurations, such as by facilitating movement of the first device from being supported at a first or second angle. In some embodiments, the second device is secured to the case, either directly or indirectly, so as to further support the first device and/or to prevent or otherwise inhibit movement of the first device away from the second device.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A case for a computing device, the case comprising:
    a main body comprising:
        a first portion that is configured to engage with the computing device, thereby moving the computing device to an engaged configuration, wherein the first portion includes a first engagement feature that is configured to engage with the computing device, the first engagement feature being a raceway defined by the first portion and the first engagement feature generates a friction interface between the first portion and the computing device; and
        a second portion hingedly coupled to said first portion such that the case is moveable between a stowed configuration and a deployed configuration while the computing device is in the engaged configuration, thereby moving the computing device between a secured configuration and an unsecured configuration, respectively, wherein the raceway defined by the first portion is configured to facilitate sliding the computing device in and out of engagement with the first portion when the case is in the deployed configuration;
    wherein the main body defines one or more discrete relief areas.

2. The case of claim 1, wherein said second portion is configured to prevent the case from sliding in and out of engagement with said first portion when the case is in the stowed configuration.

3. The case of claim 2, wherein said second portion is configured to function as a support member for supporting the computing device in a desired orientation when the case is in the deployed configuration.

4. The case of claim 2, wherein said first portion is configured to selectively engage with an auxiliary device, thereby moving the computing device to a concealed configuration.

5. The case of claim 4, wherein said first portion includes a second engagement feature that is configured to engage with the auxiliary device.

6. The case of claim 4, wherein said second portion is configured to function as a support member for supporting the computing device in a desired orientation when the case is in the deployed configuration.

7. The case of claim 4, wherein said second portion is configured to facilitate movement of the auxiliary device relative to the computing device when the case is in the deployed configuration, thereby facilitating use of the auxiliary device as a support system for the computing device.

8. The case of claim 7, wherein the auxiliary device includes a cover extending at least partially along a back surface of the computing device, a bottom portion of the cover being configured to fold away from a bottom portion of the computing device so as to form and provide the support system for the computing device, said second portion of the case being configured to rotate away from the bottom portion of the computing device so as to facilitate rotation of the bottom portion of the cover away from the bottom portion of the computing device.

9. The case of claim 8, wherein said second portion is hingedly coupled to said first portion via a living hinge.

10. A case for an electronic device, the case comprising:
    a main portion, said main portion comprising a first portion and a second portion separated by a living hinge, and wherein the main portion defines one or more discrete relief areas;
    a first perimetral wall running at least partially along a perimeter of the first portion;
    a second perimetral wall running at least partially along a perimeter of the second portion;
    a first guide surface associated with said first perimetral wall, wherein said case is movable between a stowed configuration and a deployed configuration, and
    a second guide surface associated with said second perimetral wall, wherein said second guide surface is configured to, while moving the case from the stowed configuration to the deployed configuration, enable the electronic device to disengage from the second portion and enable a keyboard to disengage from the second portion.

11. The case of claim 10, wherein moving said case between the stowed configuration and the deployed configuration includes moving said second portion relative to said first portion via said living hinge.

12. The case of claim 10, wherein said living hinge includes one or more trenches, wherein said one or more trenches facilitate rotational displacement of the first and second portions relative to each other around said living hinge.

13. The case of claim 10, wherein said second guide surface is configured to restrain a cover while in the deployed configuration.

14. A method of deploying a case for an electronic device from a stowed configuration to a deployed configuration, the method comprising:
- disengaging a keyboard from a first portion of the case;
- disengaging said keyboard from a perimetral wall of a second portion of said case;
- disengaging said electronic device from said second portion; and
- displacing said second portion rotationally relative to said first portion via a living hinge comprising one or more discrete relief areas.

15. The method of claim 14, further comprising a step of positioning said keyboard to interface with a bottom of said electronic device.

16. The method of claim 14, wherein said displacement causes a cover associated with said keyboard to rotate along said living hinge while conforming to both said first portion and said second portion.

17. The method of claim 14, wherein said electronic device is positioned in an ergonomically advantageous position when the case is in the deployed configuration.

18. The method of claim 17, wherein the keyboard is accessible to a user to provide inputs to said electronic device when the case is in the deployed configuration.

19. The method of claim 14, wherein said keyboard, a cover associated with said keyboard, and said case provide an angled support stand for said electronic device when the case is in the deployed configuration.

20. The method of claim 19, wherein said angled support stand is configurable between two or more viewing angles.

* * * * *